(12) United States Patent
Qin et al.

(10) Patent No.: US 12,416,826 B2
(45) Date of Patent: Sep. 16, 2025

(54) SUPPORT BRACKET, SUB-BACKLIGHT MODULE, DISPLAY DEVICE AND SPLICING DISPLAY MODULE

(71) Applicants: Beijing BOE Display Technology Co., Ltd., Beijing (CN); BOE Technology Group Co., Ltd., Beijing (CN)

(72) Inventors: Xuefei Qin, Beijing (CN); Yu Zhang, Beijing (CN); Zhuolong Li, Beijing (CN); Shixin Geng, Beijing (CN); Bochang Wang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/289,141

(22) PCT Filed: Feb. 20, 2023

(86) PCT No.: PCT/CN2023/077077
§ 371 (c)(1),
(2) Date: Nov. 1, 2023

(87) PCT Pub. No.: WO2023/185313
PCT Pub. Date: Oct. 5, 2023

(65) Prior Publication Data
US 2024/0219758 A1    Jul. 4, 2024

(30) Foreign Application Priority Data
Mar. 31, 2022    (CN) .......................... 202210333986.9

(51) Int. Cl.
G02F 1/1333    (2006.01)
G02F 1/13357   (2006.01)

(52) U.S. Cl.
CPC .. G02F 1/133308 (2013.01); G02F 1/133604 (2013.01); G02F 1/133605 (2013.01);
(Continued)

(58) Field of Classification Search
CPC ......... G02F 1/133308; G02F 1/133604; G02F 1/133605; G02F 1/133606;
(Continued)

(56) References Cited

U.S. PATENT DOCUMENTS

2012/0086884 A1* 4/2012 Yoshikawa ....... G02F 1/133608
362/382
2016/0320668 A1* 11/2016 Kong .................... G02F 1/1339
(Continued)

FOREIGN PATENT DOCUMENTS

| CN | 103745665 A | 4/2014 |
|---|---|---|
| CN | 203760020 U | 8/2014 |

(Continued)

Primary Examiner — Charles S Chang
(74) Attorney, Agent, or Firm — HOUTTEMAN LAW LLC

(57) ABSTRACT

Provided is a support bracket for supporting a diffuser, including: a support post and a mounting part arranged in a first direction. The mounting part includes: an elastic connection part and a base arranged opposite to each other along the first direction, the elastic connection part is connected to the base, the support post extends in the first direction and an end of the support post close to the mounting part is fixed to the elastic connection part, and the elastic connection part is configured to be elastically deformable in the first direction to change a distance between the end of the support post close to the mounting part and the base in the first direction. Further provided are a sub-backlight module, a display device and a splicing display module.

20 Claims, 16 Drawing Sheets

(52) U.S. Cl.
CPC .. *G02F 1/133606* (2013.01); *G02F 1/133608* (2013.01); *G02F 2201/46* (2013.01)

(58) Field of Classification Search
CPC ........... G02F 1/133608; G02F 2201/46; G02F 1/1336; G02F 1/133607
USPC ..................................................... 349/58–65
See application file for complete search history.

(56) References Cited

U.S. PATENT DOCUMENTS

2017/0123273  A1     5/2017  Kim
2022/0082888  A1*    3/2022  Wang ................ G02F 1/133608

FOREIGN PATENT DOCUMENTS

| CN | 205610795 U | 9/2016 |
| CN | 106200126 A | 12/2016 |
| CN | 106971672 A | 7/2017 |
| CN | 107610596 A | 1/2018 |
| CN | 110161751 A | 8/2019 |
| CN | 209460751 U | 10/2019 |
| CN | 213240760 U | 5/2021 |
| CN | 113109961 A | 7/2021 |
| CN | 215219368 U | 12/2021 |
| KR | 20070112503 A | 11/2007 |

\* cited by examiner

SUPPORT BRACKET, SUB-BACKLIGHT MODULE, DISPLAY DEVICE AND SPLICING DISPLAY MODULE

TECHNICAL FIELD

The present disclosure relates to the field of display technology, and in particular relates to a support bracket, a sub-backlight module, a display device and a splicing display module.

BACKGROUND

The direct type backlight technology involves placing a backlight module directly below a liquid crystal panel, which can help to obtain more uniform backlight brightness of a liquid crystal television, as well as finer and more vivid images.

In the conventional direct type backlight module, all sides of the diffuser are supported by an intermediate frame and the diffuser is positioned above the back plate. However, the diffuser is relatively thin, leaving a large clearance with the back plate. In order to prevent the diffuser from being recessed in the middle and thus affecting the display image, a support bracket is typically provided in the middle of the diffuser to avoid deformation of the diffuser. However, it is found in practical applications that collision between the diffuser and the support bracket inevitably occurs during installation and use of the diffuser, which may easily cause damages to the diffuser.

SUMMARY

To solve at least one of the technical problems in the existing art, the present disclosure provides a support bracket, a sub-backlight module, a display device and a splicing display module.

In a first aspect, an embodiment of the present disclosure provides a support bracket for supporting a diffuser, including: a support post and a mounting part arranged in a first direction, wherein the mounting part includes: an elastic connection part and a base arranged opposite to each other along the first direction, the elastic connection part is connected to the base, the support post extends in the first direction and an end of the support post close to the mounting part is fixed to the elastic connection part, and the elastic connection part is configured to be elastically deformable in the first direction to change a distance between the end of the support post close to the mounting part and the base in the first direction.

In some embodiments, the elastic connection part includes: two elastic parts and a connection part arranged in a second direction, wherein the connection part is positioned between the two elastic parts, one end of each elastic part is connected to the base, the other end of the elastic part is connected to the connection part, and the end of the support post close to the mounting part is fixed to the connection part; and each elastic part is configured to be elastically deformable in the first direction to change a distance between the connection part and the base in the first direction, wherein the first direction is intersected with the second direction.

In some embodiments, the elastic part is outwardly convex toward a side away from the base, and the connection part is arranged parallel to the base.

In some embodiments, the elastic part includes: a first part, a second part and a third part connected in sequence, wherein the first part is connected to the base, and the third part is connected to the connection part;

from the connection between the second part and the first part to the connection between the second part and the third part, a vertical distance between the second part and the base in the first direction gradually increases along the second direction; and from the connection between the third part and the second part to the connection between the third part and the connection part, a vertical distance between the third part and the base in the first direction gradually decreases along the second direction.

In some embodiments, on the support post away from the mounting part in the first direction, the support post has a cross section perpendicular to the first direction with an area that first remains constant and then gradually decreases.

In some embodiments, the support post has the cross section perpendicular to the first direction with a rectangular or trapezoidal shape.

In some embodiments, on the support post away from the mounting part in the first direction, the support post has a cross section perpendicular to the first direction with an area that gradually decreases.

In some embodiments, the support post has the cross section perpendicular to the first direction with a circular shape;

the end of the support post close to the mounting part has a cross section perpendicular to the first direction with a radius of 4 mm to 5 mm;

an end of the support post away from the mounting part has a cross section perpendicular to the first direction with a radius of 0.5 mm to 1.5 mm; and the support post has a length of 20 mm to 30 mm in the first direction.

In some embodiments, the base is provided with a first screw hole.

In some embodiments, a portion of the base surrounding the first screw hole is outwardly convex toward a side away from the support post.

In some embodiments, the elastic connection part, the base and the support post are integrally formed.

In a second aspect, an embodiment of the present disclosure further provides a sub-backlight module, including: the support bracket as provided in the first aspect.

In some embodiments, the sub-backlight module further includes: a back plate including a bottom plate and a side plate, wherein the side plate is positioned on a first side of the bottom plate and connected to an edge portion of the bottom plate; and the support bracket is positioned on the first side of bottom plate, with the mounting part of the support bracket fixed to the bottom plate.

In some embodiments, the sub-backlight module further includes: a plurality of light bars arranged in a third direction, wherein each light bar includes a plurality of lamp beads arranged in a fourth direction; and a ratio of the number of lamp beads to the number of support brackets is 6:1 to 10:1.

In some embodiments, for any one of the support brackets, a center of an orthographic projection of the support post on the bottom plate overlaps with a center of a quadrangle enclosed by centers of orthographic projections of four lamp beads closest to the support bracket on the bottom plate.

In some embodiments, a plurality of support brackets arranged in the fourth direction are provided on a central axis of the bottom plate; wherein
the central axis of the bottom plate is a virtual line that passes through a center of a surface on a first side of the bottom plate and extends along the fourth direction.

In some embodiments, the surface on the first side of the bottom plate has a first peripheral placement region, a central placement region and a second peripheral placement region sequentially arranged in the third direction;
the first peripheral placement region and the second peripheral placement region are each provided with at least two support bracket sets, wherein the at least two support bracket sets include: a first support bracket set, and a second support bracket set on a side of the first support bracket set away from the central placement region, and at least two light bars are provided between the first support bracket set and the second support bracket set; and
the first support bracket set and the second support bracket set each include at least two of the support brackets arranged in the fourth direction, and the number of support brackets in the first support bracket set is larger than the number of support brackets in the second support bracket set.

In some embodiments, a reflective sheet is disposed on a side of the light bar facing away from the bottom plate;
the reflective sheet is provided with a plurality of first openings in one-to-one correspondence with the lamp beads, and each lamp bead is exposed out of the corresponding first opening;
the reflective sheet is provided with a plurality of second openings in one-to-one correspondence with the support brackets, and the bottom plate is provided with a plurality of second screw holes; and
each support bracket is fixed to the bottom plate via a screw penetrating the corresponding second opening, the first screw hole, and the corresponding second screw hole in the bottom plate.

In some embodiments, all the light bars are divided into a plurality of light bar sets, each light bar set includes at least one light bar, each light bar set is configured with a corresponding adapter plate, and each light bar is electrically connected to the corresponding adapter plate through a first flexible flat cable;
the adapter plate is fixed on a first side of the bottom plate, and the adapter plate is electrically connected to a power supply control module on a second side of the bottom plate through a second flexible flat cable penetrating the bottom plate; and
a receiving slot is formed on the bottom plate in a region corresponding to the adapter plate, and the adapter plate is positioned in the corresponding receiving slot.

In some embodiments, the sub-backlight module further includes: a intermediate frame and a diffuser, wherein the intermediate frame is assembled with and fixed to the back plate;
the intermediate frame includes: a first support structure and a second support structure, wherein a side of the first support structure away from the bottom plate is a first support surface, and the second support structure is positioned on a side of the first support surface away from the bottom plate;
the diffuser is positioned on the side of the first support surface away from the bottom plate and on an inner side of the second support structure, a clearance space is formed between the diffuser and an inner side wall of the second support structure, and an orthographic projection of the diffuser on the first support surface overlaps the first support surface;
a light guide bar is provided between the first support surface and the diffuser;
a first side of the light guide bar close to the second support structure is in contact with the inner side wall of the second support structure; and
a second side of the light guide bar away from the second support structure exceeds an inner edge of the first support surface.

In some embodiments, a prism film is formed on the inner side wall of the second support structure, and configured to reflect the light in the clearance space emitted to the inner side wall of the second support structure toward the light guide bar.

In some embodiments, the prism film is a Fresnel prism film.

In some embodiments, the intermediate frame includes four support frame bars connected end to end in sequence, each support frame bar includes the first support structure and the second support structure, and a side of the second support structure away from the bottom plate is a second support surface;
the four support frame bars include one first support frame bar and three second support frame bars; and
a ratio of a width of the second support surface on the first support frame bar to a width of the second support surface on each second support frame bar is 8:1 to 20:1.

In a third aspect, an embodiment of the present disclosure further provides a display device, including: the sub-backlight module as provided in the second aspect.

In some embodiments, the display device further includes: a display panel fixed to the second support surface;
b) the display panel includes an active area and a peripheral area surrounding the active area, and the peripheral area includes: one chip-on-film side region and three non-chip-on-film side regions; wherein
c) the chip-on-film side region is arranged opposite to the second support surface on the first support frame bar, and the three non-chip-on-film side regions are respectively arranged opposite to the second support surfaces on the three second support frame bars.

In some embodiments, the chip-on-film side region is fixed to the second support surface on the first support frame bar via a double-sided tape; and
each non-chip-on-film side region is fixed to the second support surface on the corresponding second support frame bar via ultraviolet curing glue.

In a fourth aspect, an embodiment of the present disclosure further provides a splicing display module, including: 2N display devices, the 2N display devices are arranged in an array of two rows and N columns, where N is a positive integer;
chip-on-film side regions of N display devices in a first row are all positioned on a side away from a second row of display devices; and
chip-on-film side regions of N display devices in the second row are all positioned on a side away from the first row of display devices.

DETAIL DESCRIPTION OF EMBODIMENTS

To better understand the technical solution of the present disclosure for those skilled in the art, the support bracket, the sub-backlight module, the display device and the splicing display module of the present disclosure will be described in detail below in conjunction with the accompanying drawings.

Figure 1A:
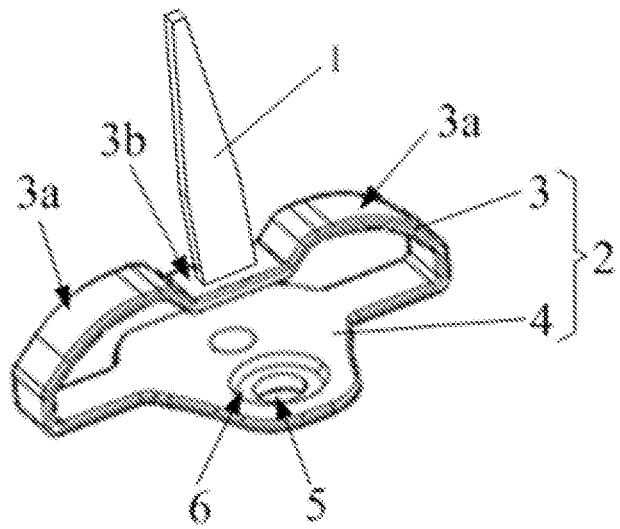
FIG. 1A is a schematic structural view of a support bracket according to an embodiment of the present disclosure.
Figure 1B:
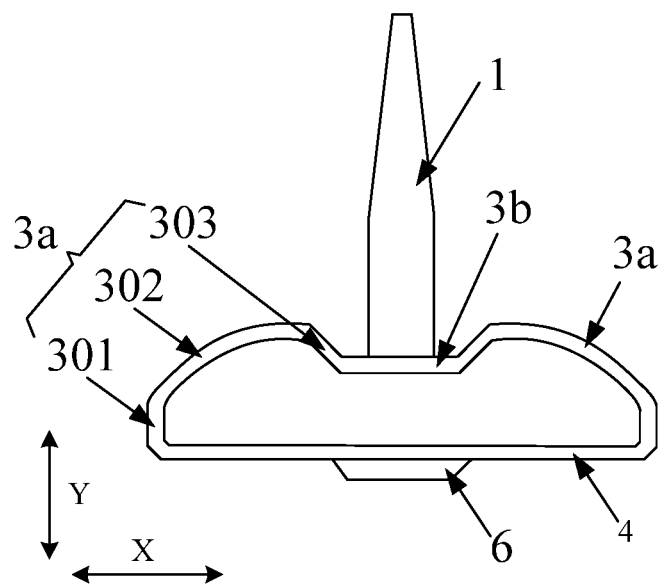
FIG. 1B is a schematic sectional view of the support bracket shown in FIG. 1A.

FIG. 1A is a schematic structural view of a support bracket according to an embodiment of the present disclosure, and FIG. 1B is a schematic sectional view of the support bracket shown in FIG. 1. As shown in FIGS. 1A and 1, the support bracket is used for supporting a diffuser and includes: a support post 1 and a mounting part 2 arranged in a first direction Y. The mounting part 2 includes: an elastic connection part 3 and a base 4 arranged opposite to each other along the first direction Y. The elastic connection part 3 is connected to the base 4, and the support post 1 extends in the first direction Y, and an end of the support post 1 close to the mounting part 2 is fixed to the elastic connection part 3, and the elastic connection part 3 is configured to be elastically deformable in the first direction Y, so as to change a distance between the end of the support post 1 close to the mounting part 2 and the base 4 in the first direction Y.

In an embodiment of the present disclosure, by providing the elastic connection part 3 between the base 4 and the support post 1, when the diffuser collides with an end of the support post 1 away from the mounting part 2, the elastic connection part 3 may be elastically deformed under an applied force, thereby having a cushioning effect, and thus effectively reducing the cracking risk of the diffuser.

In some embodiments, the elastic connection part 3 includes: two elastic parts 3a and a connection part 3b arranged in a second direction X. The connection part is positioned between the two elastic parts 3a. One end of each elastic part 3a is connected to the base 4, and the other end of the elastic part 3a is connected to the connection part 3b. The end of the support post 1 close to the mounting part 2 is fixed to the connection part 3b. Each elastic part 3a is configured to be elastically deformable in the first direction Y, so as to change a distance between the connection part 3b and the base 4 in the first direction Y, where the first direction Y is intersected with the second direction X.

By providing the above two elastic parts 3a and the connection part 3b, on one hand, stable support of the support post 1 can be realized, and on the other hand, corresponding elastic deformation can be rapidly generated when the support post 1 is subjected to an external force.

In some embodiments, the elastic part 3a is outwardly convex toward a side away from the back plate, and the connection part is arranged parallel to the base 4.

In some embodiments, the elastic part 3a has a bar shape and includes: a first part 301, a second part 302 and a third part 303 connected in sequence. The first part 301 is connected to the base 4, and the third part 303 is connected to the connection part 3b. From the connection between the second part 302 and the first part 301 to the connection between the second part 302 and the third part 303, a vertical distance between the second part 302 and the base in the first direction Y gradually increases along the second direction X. From the connection between the third part 303 and the second part 302 to the connection between the third part 303 and the connection part, a vertical distance between the third part 303 and the base in the first direction Y gradually decreases along the second direction X.

It should be noted that the case where the elastic connection part 3 includes two elastic parts 3a and one connection part 3b is merely an optional implementation of the embodiment of the present disclosure, and does not form any limitation to the technical solution of the present disclosure. In the present disclosure, the elastic connection part 3 may also adopt other structures capable of generating elastic deformation under the action of an external force, which are not listed one by one here.

In some embodiments, when the diffuser is not supported on the support bracket, the connection part 3b and the base 4 has a distance h in the first direction Y, and 0.45 mm≤h≤0.55 mm.

Referring to FIGS. 1A and 1A, in some embodiments, on the support post 1 away from the mounting part 2 in the first direction Y, the support post 1 has a cross section perpendicular to the first direction Y with an area that first remains constant and then gradually decreases.

In some embodiments, the support post has the cross section perpendicular to the first direction with a rectangular or trapezoidal shape.

Figure 2A:
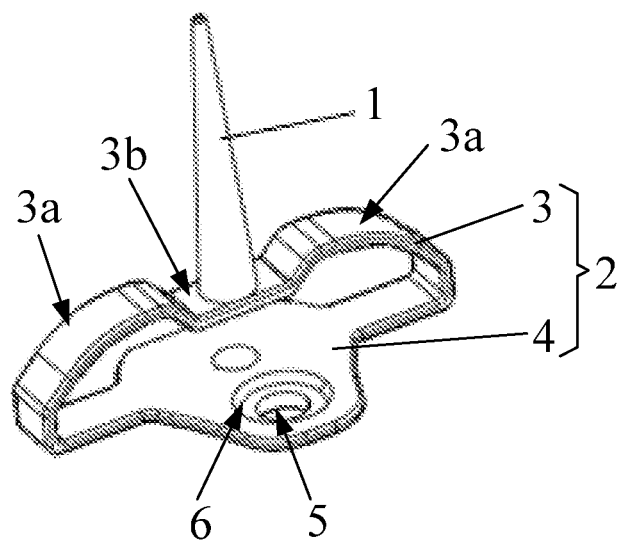
FIG. 2A is another schematic structural view of a support bracket according to an embodiment of the present disclosure.
Figure 2B:
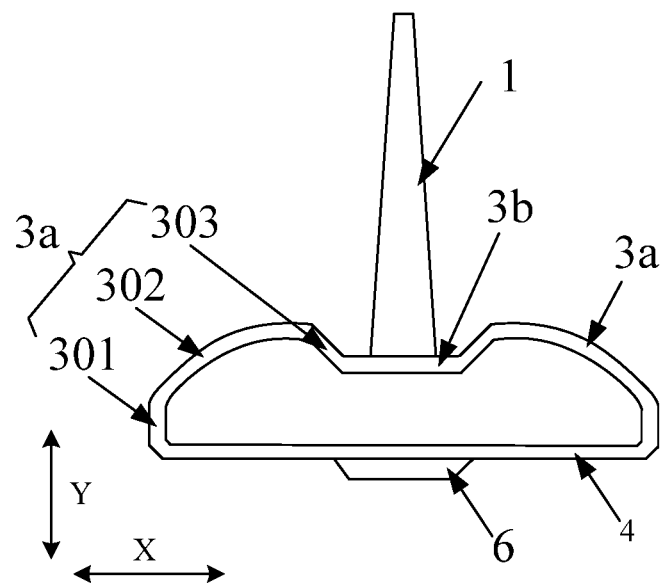
FIG. 2B is another schematic sectional view of the support bracket shown in FIG. 2A.

Referring to FIGS. 2A and 2B, in some embodiments, on the support post 1 away from the mounting part 2 in the first direction Y, the support post 1 has a cross section perpendicular to the first direction Y with an area that gradually decreases. With such a design, the support post 1 presents an overall shape narrow at the top and wide at the bottom, which on one hand reduces an overall weight of the support post 1, and on the other hand enables a larger connection area between the bottom end (the end close to the mounting part 2) of the support post 1 and the mounting part 2, so as to ensure firm connection between the support post 1 and the mounting part 2. Meanwhile, the top end (the end away from the mounting part 2) of the support post 1 will not be too large, so that a contact area between the support post 1 and the diffuser is relatively small, which is beneficial to increasing an amount of light incident on the diffuser.

In addition, considering that the smaller a top area of the support post 1 is, the greater the pressure intensity on the diffuser is when the support post 1 collides with the diffuser, and the higher the risk of the diffuser being broken is, the top area of the support post 1 cannot be designed to be too small.

In some embodiments, the support post 1 has the cross section perpendicular to the first direction Y with a circular shape. The end of the support post 1 close to the mounting part 2 has a cross section perpendicular to the first direction Y with a radius of 4 mm to 5 mm. The end of the support post 1 away from the mounting part 2 has a cross section perpendicular to the first direction Y with a radius of 0.5 mm to 1.5 mm. The support post 1 has a length of 20 mm to 30 mm in the first direction Y.

With continued reference to FIGS. 1 and 2, in some embodiments, the base 4 is provided with a first screw hole 5. A second screw hole is formed on the back plate at a position corresponding to a region where the support bracket can be placed. When the support bracket is assembled with the back plate, the support bracket can be fixed at a corresponding position on the back plate simply by passing a screw through the first screw hole 5 in the support bracket and the second screw hole in the back plate at the corresponding position.

In some embodiments, a portion 6 of the base 4 surrounding the first screw hole 5 is outwardly convex toward a side away from the support post 1. A portion of the bottom plate surrounding the second screw hole may be outwardly convex toward a side facing away from the support surface to form a positioning slot. When the support bracket is assembled with the back plate, the outwardly convex portion 6 surrounding the first screw hole 5 on the support bracket may be placed into the positioning slot in the bottom plate, which can, on one hand, implement alignment of the first screw hole 5 and the second screw hole, and on the other hand, have a function of limiting the support bracket to prevent mismatched movement between the support bracket and the back plate.

In some embodiments, the elastic connection part 3, the base 4 and the support post 1 are each made of a transparent resin material, which can effective avoid shielding of the light emitted from the backlight source after the support bracket is assembled with the back plate.

In some embodiments, the elastic connection part 3, the base 4 and the support post 1 are integrally formed. Optionally, the integrally formed elastic connection part 3, base 4 and support post 1 may be formed by injection molding.

Figure 3:
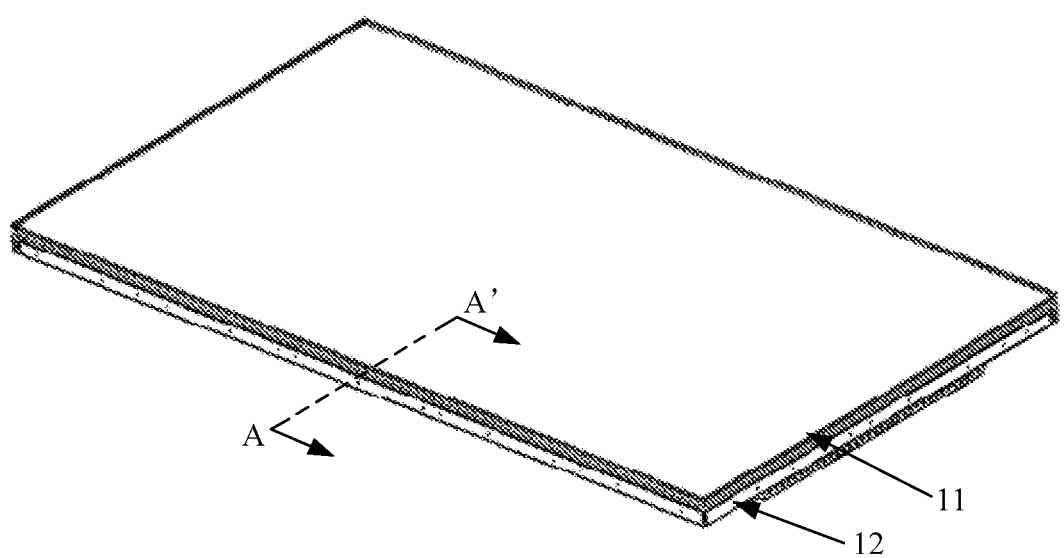
FIG. 3 is a schematic structural view of a sub-backlight module according to an embodiment of the present disclosure.
Figure 4:
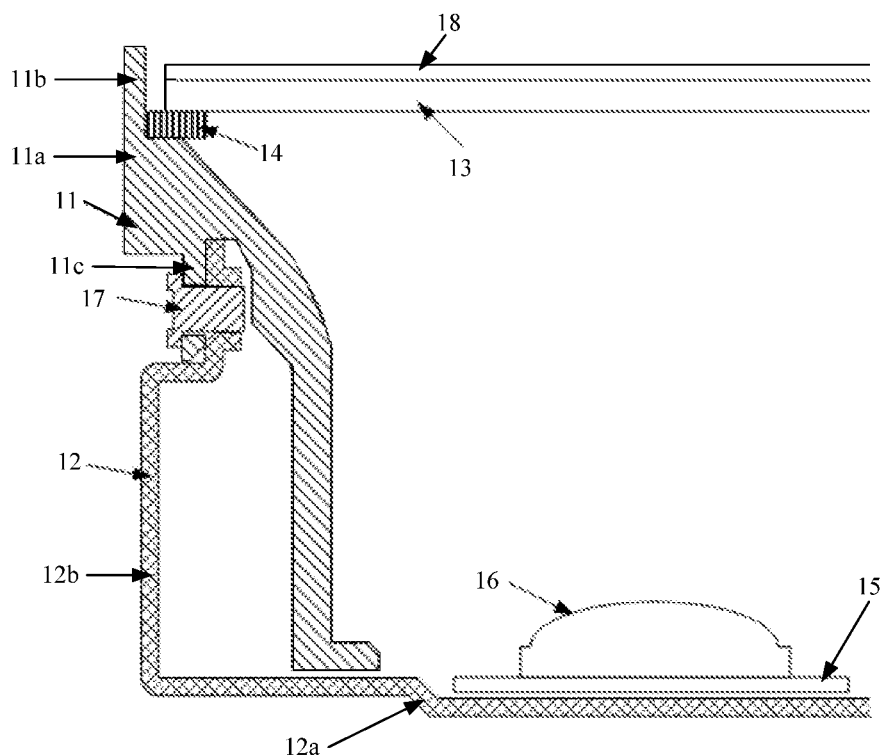
FIG. 4 is a schematic sectional view taken along line A-A' of FIG. 3.
Figure 5:
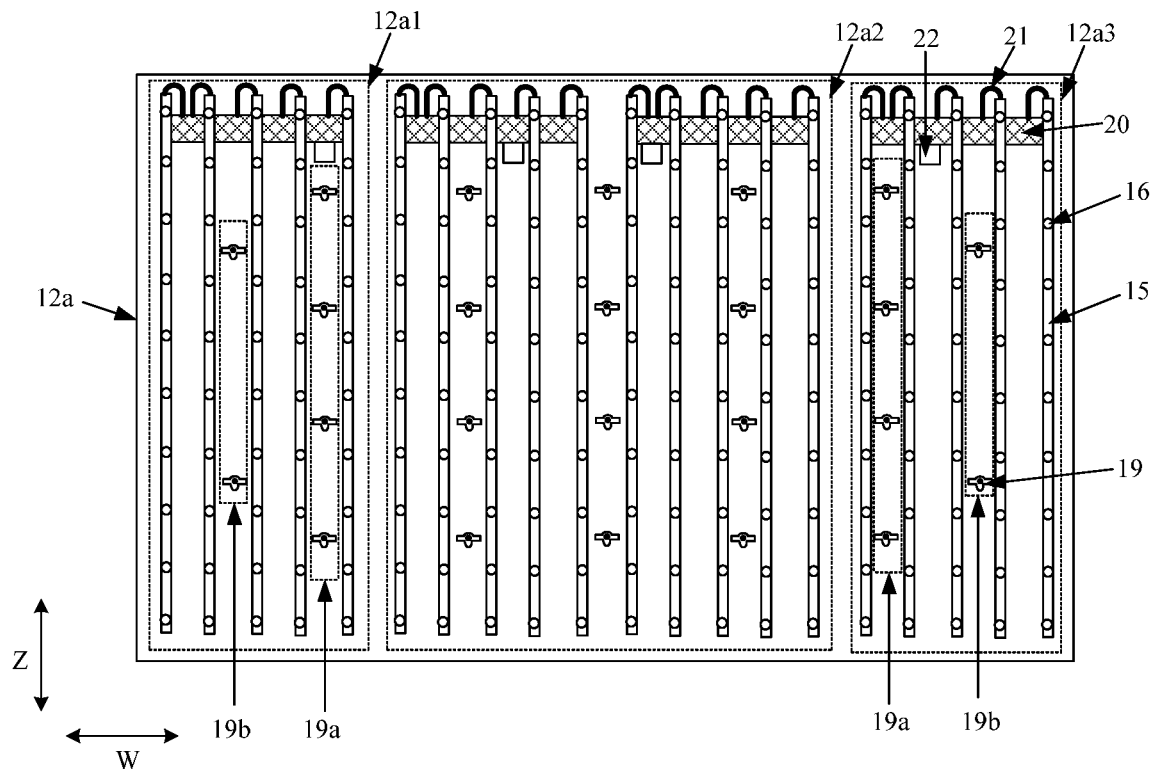
FIG. 5 is a schematic top view of a back plate according to an embodiment of the present disclosure.
Figure 6:
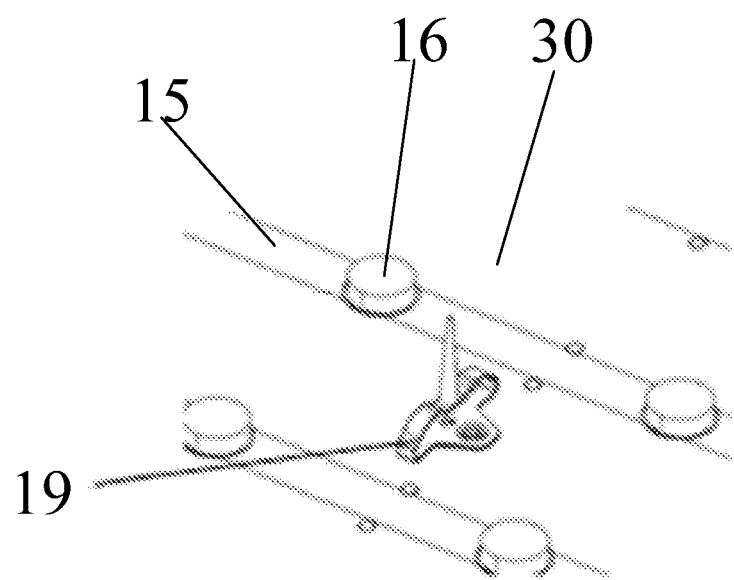
FIG. 6 is a schematic structural view of lamp beads in a partial region of a back plate and a support bracket.

FIG. 3 is a schematic structural view of a sub-backlight module according to an embodiment of the present disclosure, FIG. 4 is a schematic sectional view taken along line A-A' of FIG. 3, FIG. 5 is a schematic top view of a back plate according to an embodiment of the present disclosure, and FIG. 6 is a schematic structural view of lamp beads in a partial region of a back plate and a support bracket. As shown in FIGS. 3 to 6, the sub-backlight module includes a support bracket 19, which adopts the support bracket 19 provided in the above embodiment. For the description of the support bracket 19, reference may be made to the contents in the foregoing embodiment, which is not repeated here.

In some embodiments, the sub-backlight module further includes a back plate 12 including a bottom plate 12a and a side plate 12b. The side plate 12b is positioned on a first side of the bottom plate 12a and connected to an edge portion of the bottom plate 12a. The support bracket 19 is positioned on the first side of bottom plate 12a, with the mounting part of the support bracket 19 fixed to the bottom plate 12a.

The sub-backlight module further includes a plurality of light bars 15 arranged in a third direction W. Each light bar 15 includes a plurality of lamp beads 16 arranged in a fourth direction Z. The light bars 15 may be fixed on the back plate 12 by a double-sided tape.

In some embodiments, a ratio of the number of lamp beads 16 to the number of support brackets 19 is 6:1 to 10:1. In practical applications, the number and arrangement of the lamp beads 16 may be set according to the brightness requirement of the display device, while the number and arrangement of the support brackets 19 may be set according to the supporting requirement of the diffuser 13. In addition, with a fixed number of lamp beads 16, more support brackets 19 can provide a better supporting effect for the diffuser 13, but with a greater influence on light emission of the light bars 15. In an embodiment of the present disclosure, comprehensively considering the light emitting effect of the light bars 15 and the support reliability of the diffuser 13, the ratio of the number of lamp beads 16 to the number of support brackets 19 may be set to the range of 6:1 to 10:1, such as 8:1.

In some embodiments, for any one of the support brackets 19, a center of an orthographic projection of the support post 1 of the support bracket 19 on the bottom plate 12a overlaps with a center of a quadrangle enclosed by centers of orthographic projections of four lamp beads 16 closest to the support bracket 19 on the bottom plate 12a.

Referring to FIG. 5, in some embodiments, a plurality of support brackets 19 arranged in the fourth direction Z are provided on a central axis L of the bottom plate 12a. The central axis L of the bottom plate 12a is a virtual line that passes through a center of a surface on a first side of the bottom plate 12a and extends along the fourth direction Z. In an embodiment of the present disclosure, considering that a middle portion of the diffuser tends to be deformed most due to gravity, a column of support brackets 19 are disposed on the central axis L of the bottom plate 12a in the embodiment of the present disclosure.

In some embodiments, the surface on the first side of the bottom plate 12a has a first peripheral placement region 12a1, a central placement region 12a2 and a second peripheral placement region 12a3 sequentially arranged in the third direction W. The first peripheral placement region 12a1 and the second peripheral placement region 12a3 are each provided with at least two support bracket sets. The at least two support bracket sets include: a first support bracket set 19a, and a second support bracket set 19b on a side of the first support bracket set 19a away from the central placement region 12a2. At least two light bars 15 are provided between the first support bracket set 19a and the second support bracket set 19b. The first support bracket set 19a and the second support bracket set 19b each include at least two of the support brackets 19 arranged in the fourth direction Z, and the number of support brackets 19 in the first support bracket set 19a is larger than the number of support brackets 19 in the second support bracket set 19b.

The drawings merely exemplarily show a case where two light bars 15 are provided between the first support bracket set 19a and the second support bracket set 19b, the first support bracket set 19a includes four support brackets 19, and the second support bracket set 19b includes two support brackets 19, which is merely exemplary, and does not configure any limitation to the technical solution of the present disclosure.

In some embodiments, the support brackets 19 in the central placement region 12a2 are arranged in an array along the third and fourth directions.

Referring to FIG. 5, the number of the light bars 15 is twenty, and each light bar 15 includes ten lamp beads 16. Taking the third direction W as a row direction and the fourth direction Z as a column direction, all the lamp beads 16 are arranged in an array of ten rows and twenty columns.

Meanwhile, twenty-four support brackets 19 are provided and specifically distributed as follows: five support brackets 19 are respectively disposed between the second row of lamp beads 16 and the third row of lamp beads 16, between the fourth row of lamp beads 16 and the fifth row of lamp beads 16, between the sixth row of lamp beads 16 and the seventh row of lamp beads 16, and between the eighth row of lamp beads 16 and the ninth row of lamp beads 16, and the five support brackets 19 are respectively positioned between the fourth column of lamp beads 16 and the fifth column of lamp beads 16, between the seventh column of lamp beads 16 and the eighth column of lamp beads 16, between the tenth column of lamp beads 16 and the eleventh column of lamp beads 16, between the thirteenth column of lamp beads 16 and the fourteenth column of lamp beads 16, and between the sixteenth column of lamp beads 16 and the seventeenth column of lamp beads 16; and two support brackets 19 are respectively disposed between the third row of lamp beads 16 and the fourth row of lamp beads 16, and between the seventh row of lamp beads 16 and the eighth row of lamp beads 16, and the two support brackets 19 are respectively positioned between the second column of lamp beads 16 and the third column of lamp beads 16, and between the eighteenth column of lamp beads 16 and the nineteenth column of lamp beads 16.

Apparently, the number and distribution of the lamp beads 16 and the number and distributed of the support brackets 19 shown in FIG. 5 merely form an optional implementation for the embodiment of the present disclosure, and do not form any limitation to the technical solution of the present disclosure.

In some implementations, a reflective sheet 30 is disposed on a side of the light bar 15 facing away from the bottom plate 12a. The reflective sheet 30 is provided with a plurality of first openings in one-to-one correspondence with the lamp beads 16, and each lamp bead 16 is exposed out of the corresponding first opening. By providing the reflective sheet 30 on the back plate 12, the light emitted to the bottom plate 12a can be reflected to the diffuser 13, which is beneficial to improving the utilization rate of light.

Further optionally, when the base of the support bracket 19 is provided with a first screw hole, a plurality of second openings in one-to-one correspondence with the support brackets 19 may be provided in the reflective sheet 30, and a plurality of second screw holes may be provided in the bottom plate 12a. Via a screw penetrating the corresponding second opening, the first screw hole in the support bracket 19, and the corresponding second screw hole in the bottom plate 12a, the support bracket 19 is fixed to the bottom plate 12a.

Figure 7:
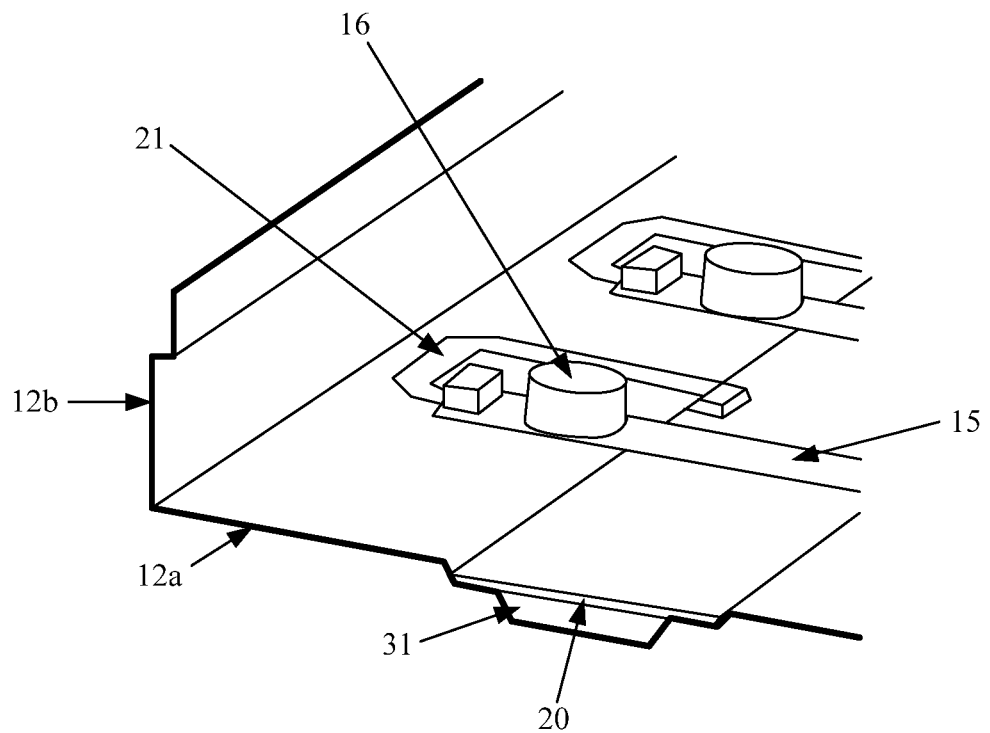
FIG. 7 is a schematic structural view of an adapter plate disposed on a back plate according to an embodiment of the present disclosure.

FIG. 7 is a schematic structural view of an adapter plate disposed on a back plate according to an embodiment of the present disclosure. As shown in FIGS. 6 and 7, in some embodiments, all the light bars 15 are divided into a plurality of light bar 15 sets each including at least one light bar 15. Each light bar 15 set is configured with a corresponding adapter plate 20, and each light bar 15 is electrically connected to the corresponding adapter plate 20 through a first flexible flat cable 21. The adapter plate 20 is fixed on a first side of the bottom plate 12a. The adapter plate 20 is electrically connected to a power supply control module 80 (shown in FIG. 13 later) on a second side of the bottom plate 12a through a second flexible flat cable 22 penetrating the bottom plate 12a.

The power supply control module may provide an electrical signal to the light bar 15 through the second flexible flat cable 22, the adapter plate 20, and the first flexible flat cable 21. In some embodiments, the power supply control module has a local dimming function, which is beneficial to improving the contrast of the display screen.

In some embodiments, a receiving slot 31 is formed on the bottom plate 12a in a region corresponding to the adapter plate 20, and the adapter plate 20 is positioned in the corresponding receiving slot 31. Specifically, the portion for placing the adapter plate 20 on the bottom plate 12a is outwardly convex toward a side facing away from the support surface to form the receiving slot 31, and the adapter plate 20 is placed into the receiving slot 31 so that the adapter plate 20 sinks, thereby preventing the adapter plate 20 from locally jacking up the light bar 15.

As a specific example, the twenty light bars 15 shown in FIG. 5 may be configured with four adapter plates 20, and each adapter plate 20 may be connected to five light bars 15.

Referring to FIG. 4, in some embodiments, the sub-backlight module further includes a intermediate frame 11 and a diffuser 13. The intermediate frame 11 is assembled with and fixed to the back plate 12. The intermediate frame 11 includes: a first support structure 11a and a second support structure 11b. A side of the first support structure 11a away from the bottom plate 12a is a first support surface, and the second support structure 11b is positioned on a side of the first support surface away from the bottom plate 12a. The diffuser 13 is positioned on the side of the first support surface away from the bottom plate 12a and on an inner side of the second support structure 11b. A clearance space (an expansion space reserved for installation of the diffuser 13) is formed between the diffuser 13 and an inner side wall of the second support structure 11b. An orthographic projection of the diffuser 13 on the first support surface overlaps the first support surface. In an embodiment of the present disclosure, the first support surface may be used to support an edge portion of the diffuser 13, while the support bracket 19 may be used to support a middle portion of the diffuser 13. In some embodiments, a light guide bar 14 is provided between the first support surface and the diffuser 13.

Figure 8:
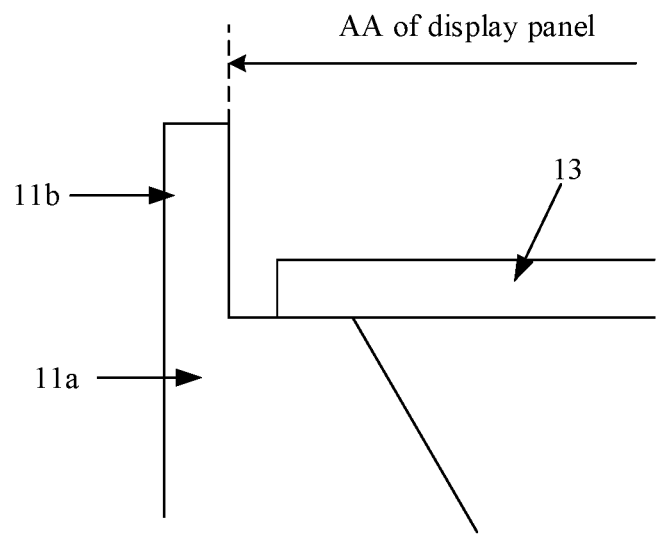
FIG. 8 is a schematic sectional view of a diffuser according to the existing art when an edge portion of the diffuser is placed on a first support surface.

FIG. 8 is a schematic sectional view of a diffuser according to the existing art when an edge portion of the diffuser is placed on a first support surface. As shown in FIG. 8, in the existing art, an edge portion of the diffuser 13 is directly lapped on the first support surface. Due to the narrow bezel design of the display product, after the display panel and the sub-backlight module are assembled, the portion of the diffuser 13 lapped on the first support surface has an orthogonal projection on the display panel that will cover an active area (AA) of the display panel. Since the portion of the diffuser 13 lapped on the first support surface has a low light-emitting brightness (referred to as a "low-brightness light-emitting portion"), light received by a region (i.e., an edge portion of the AA) on the display panel opposite to the low-brightness light-emitting portion is reduced, so that the edge portion of the display screen has a low display brightness, causing the so-called "dark edge" problem.

Figure 9:
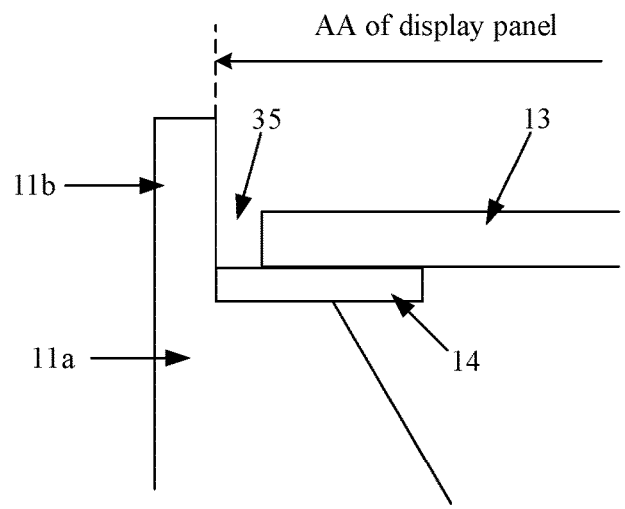
FIG. 9 is a schematic sectional view of a diffuser according to an embodiment of the present disclosure when an edge portion of the diffuser is placed on a first support surface.

FIG. 9 is a schematic sectional view of a diffuser according to an embodiment of the present disclosure when an edge portion of the diffuser is placed on a first support surface. As shown in FIG. 9, in order to effectively solve the "dark edge" problem, a light guide bar 14 is provided on the first support surface, and the diffuser 13 is lapped on the light guide bar 14. When the light emitted from the lamp beads 16 illuminates the light guide bar 14, the light guide bar 14 may transmit the light to the edge portion of the diffuser 13, so that the edge portion of the diffuser 13 has an increased light-emitting brightness, the light received by the edge portion of the AA of the display panel is increased, and the display brightness at the edge portion of the AA of the display panel is increased, thereby effectively improving and even eliminating the "dark edge" problem.

In some embodiments, a first side of the light guide bar 14 close to the second support structure 11b is in contact with the inner side wall of the second support structure 11b, and a second side of the light guide bar 14 away from the second support structure 11b exceeds an inner edge of the first support surface. The farther the second side of the light guide bar 14 away from the second support structure 11b exceeds the inner edge of the first support surface, the thicker the light guide bar 14 is, the more light is incident on the light guide bar 14, and the more beneficial is to increasing the light-emitting brightness at the edge portion of the diffuser 13. However, as the second side of the light guide bar 14 away from the second support structure 11b exceeds the inner edge of the first support surface farther, the center of gravity of the light guide plate may shift toward a direction away from the inner side wall of the second support structure 11b, When the center of gravity of the light guide plate shifts to exceed the inner edge of the first support surface, the light guide plate is likely to be tilted, which is unfavorable for assembly of the light guide plate. In addition, as the light guide bar 14 becomes thicker, the assembly space for the diffuser 13 and an optical film 18 is reduced, which is unfavorable for assembly of the diffuser 13 and the optical film 18.

Considering the light-emitting brightness at the edge portion of the diffuser 13 and the difficulty of assembling the light guide plate/the diffuser 13/the optical film 18, a thickness of the light guide bar 14 in the first direction in the embodiment of the present disclosure is set to 1.2 mm to 1.6 mm, for example, 1.4 mm; and the second side of the light guide bar 14 away from the second support structure 11b exceeds the inner edge of the first support surface by 1 mm to 2 mm, for example, 1.5 mm.

Since a clearance space 35 is formed between the diffuser 13 and the inner side wall of the second support structure 11b, a part of light on the light guide bar 14 will enter the clearance space 35, where a small part of the light passes through the clearance space 35 at a small angle (an included angle formed by the light and a normal on a surface of the light guide plate), while most light is incident on the inner side wall of the second support structure 11b in a direction at a large angle. Since the inner side wall is generally made of a metal material, the surface of the inner side wall has good specular reflectivity, so that the light incident on the surface of the inner side wall is specularly reflected, and then emitted toward the edge portion of the AA of the display panel at a large angle. In this case, the edge portion of the AA of the display panel appears dark in front view and bright in side view.

Figure 10:
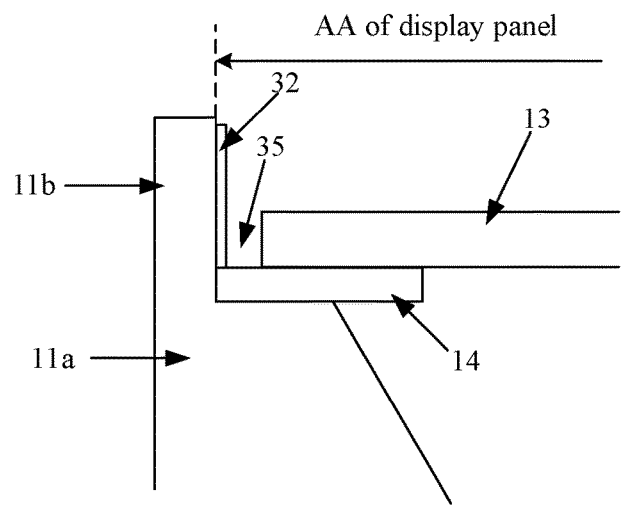
FIG. 10 is another schematic sectional view of a diffuser according to an embodiment of the present disclosure when an edge portion of the diffuser is placed on a first support surface.

FIG. 10 is another schematic sectional view of a diffuser according to an embodiment of the present disclosure when an edge portion of the diffuser is placed on a first support surface. As shown in FIG. 10, in order to relieve the problem that the edge portion of the AA of the display panel appears dark in front view and bright in side view, according to the technical solution of the present disclosure, a prism film 32 is formed on the inner side wall of the second support structure 11b. The prism film 32 is configured to reflect the light in the clearance space 35 emitted to the inner side wall of the second support structure 11b toward the light guide bar 14. In other words, the light incident on the inner side wall of the second support structure 11b at a large angle are reflected to the light guide bar 14 by the prism film 32, where in a portion of the light reaching the light guide bar 14 are refracted and then transmitted again in the light guide bar 14, and finally pass through the clearance space 35 in a direction at a small angle. Through this technical solution, the light exiting the clearance space 35 in a direction at a large angle is reduced, while the light exiting in a direction at a small angle is increased, so as to effectively relieve, and even eliminate, the problem that the edge portion of the AA of the display panel appears dark in front view and bright in side view.

In practical applications, to reserve an assembly error space, the prism film 32 is designed to have an area slightly smaller than an area of a portion on the inner side wall of the second support structure 11b that is not in contact with the light guide bar. Apparently, without considering the assembly error space, the prism film 32 may just cover the portion on the inner side wall of the second support structure 11b that is not in contact with the light guide bar (the prism film 32 is designed to have an area equal to the area of the portion on the inner side wall of the second support structure 11b that is not in contact with the light guide bar).

It should be noted that the size and reflecting angle of each prism on the prism film may be simulated and designed in advance according to the actual dimming requirement, so as to meet the requirement of actual use. In some embodiments, the prism film is a Fresnel prism film.

Figure 11:
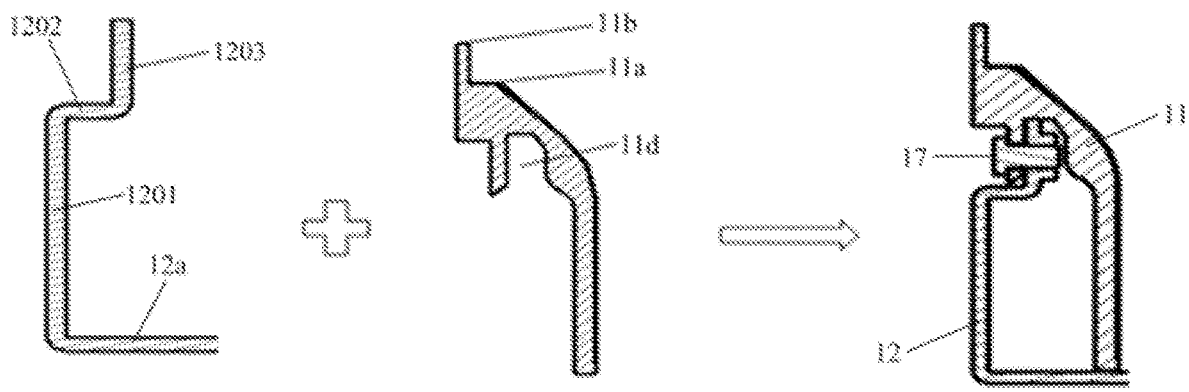
FIG. 11 is a schematic structural view showing assembly of the intermediate frame and the back plate according to an embodiment of the present disclosure.

FIG. 11 is a schematic structural view showing assembly of the intermediate frame and the back plate according to an embodiment of the present disclosure. As shown in FIG. 11, in some embodiments, the intermediate frame 11 further includes an assembling part 11c fixed to the back plate 12. The assembling part 11c is positioned on a side of the second support structure 11b away from the second support structure 11b. A sink 11d is formed on the assembling part 11c, and an opening of the sink 11d faces away from the first support structure 11a. A side plate 12b on the back plate 12 includes a first support plate 1201 connected to the bottom plate 12a, a second support plate 1202 connected to the second support plate 1201, and a third support plate 1203 connected to the second support plate 1202. The first support plate 1201, the second support plate 1202 and the third support plate 1203 are formed by a same panel through secondary bending. An outer side wall of the sink 11d and the third support plate 1203 are each provided with a screw hole, respectively. The back plate 12 is fixed to the intermediate frame 11 by placing the third support plate 1203 into the sink 11d and inserting a screw 17 through the screw holes in the outer side wall and the third support plate 1203. In some embodiments, an end of the third support plate 1203 contacts the bottom plate 12a of the sink 11d, and an side wall of the assembling part 11c enclosing the sink 11d and having a screw hole contacts the second support plate 1202, so as to implement stable assembly of the plate and the intermediate frame 11.

Figure 12A:
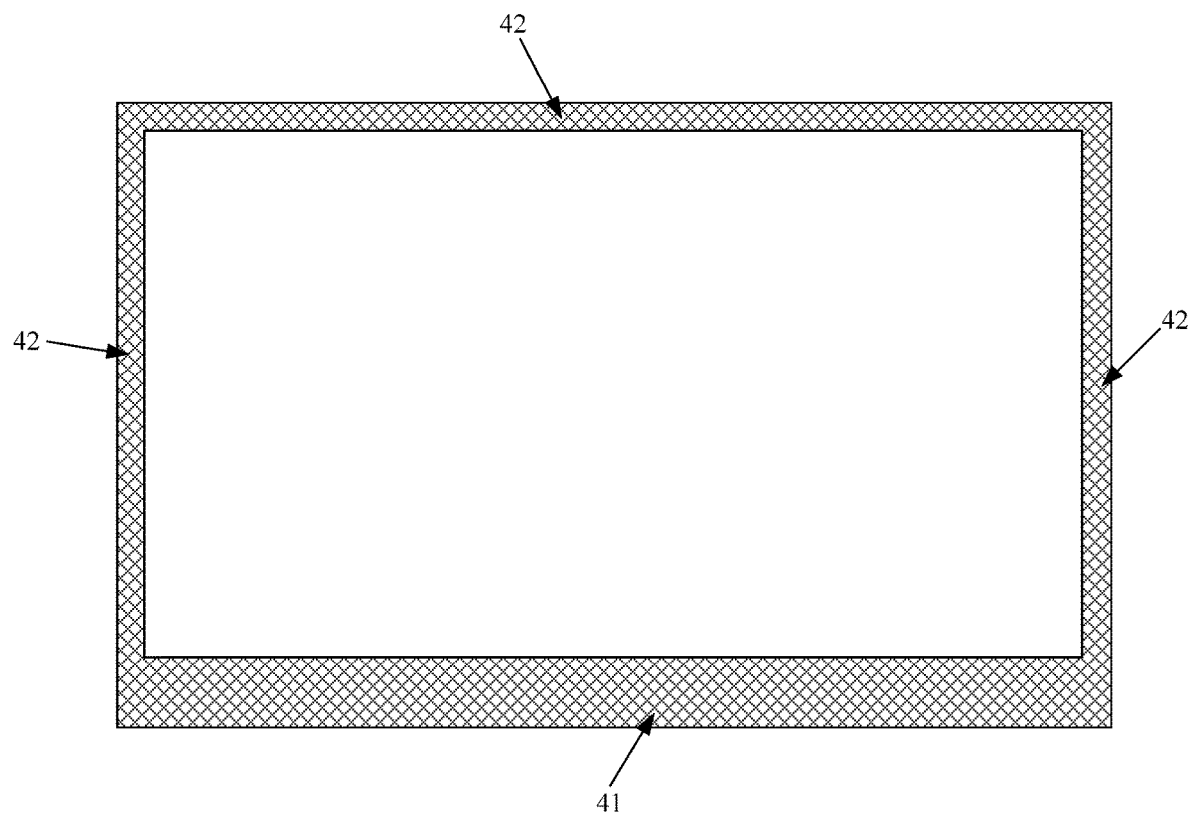
FIG. 12A is a schematic top view of a second support surface of four support frame bars in an intermediate frame according to an embodiment of the present disclosure.
Figure 12B:
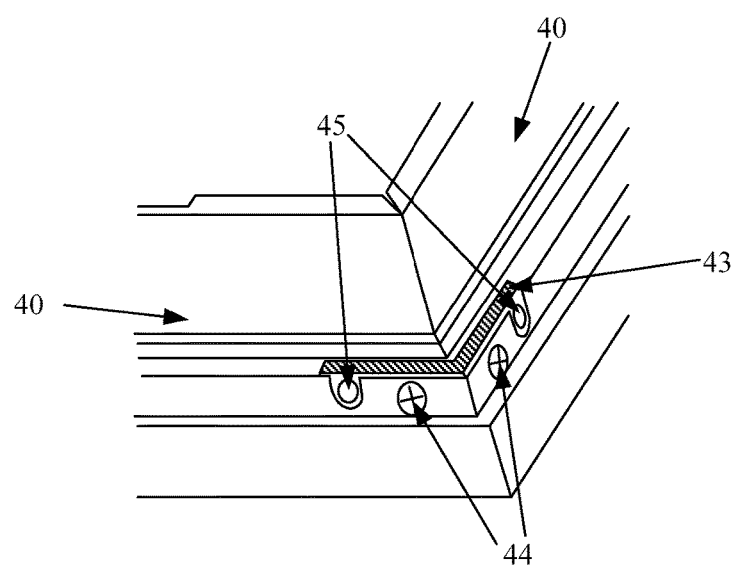
FIG. 12B is a schematic structural view showing connection between two adjacent support frame bars according to an embodiment of the present disclosure.

FIG. 12A is a schematic top view of a second support surface of four support frame bars in a intermediate frame according to an embodiment of the present disclosure, and FIG. 12B is a schematic structural view showing connection between two adjacent support frame bars according to an embodiment of the present disclosure. As shown in FIGS. 12A and 12B, in some embodiments, the intermediate frame 11 includes four support frame bars 40 connected end to end in sequence. Each support frame bar 40 includes a first support structure 11a and a second support structure 11b. Two ends of two adjacent support frame bars 40 may be fixed with a corner block.

In some embodiments, the corner block has a first connection bar and a second connection bar perpendicular to each other. The first connection bar and the second connection bar are each provided with a screw hole. The side wall of the assembling part 11c enclosing the sink at an end position of the support frame bar is formed with a screw hole. The first connection bar and the second connection bar of the corner block 43 may be placed into the sink 11d of two support frame bars to be connected, and a screw 44 is used to penetrate the screw hole at the end position of the support frame bar and the screw hole in the first connection bar/the second connection bar, so that the two support frame bars 40 to be connected are connected with a same corner block.

In some embodiments, the first connection bar and the second connection bar are each provided with a positioning protrusion 45, and a positioning opening is formed at the end position of the support frame bar 40. By placing the positioning protrusion 45 on the first connection bar/the second connection bar in the positioning opening, the support frame bar 40 is positioned relative to the first connection bar or the second connection bar, so as to facilitate the subsequent fixing of the support frame bar and the first connection bar or the second connection bar by using the screw 44.

In some embodiments, a side of the second support structure 11b away from the bottom plate 12a is a second support surface. The four support frame bars include one first support frame bar 41 and three second support frame bars 42. A ratio of a width of the second support surface on the first support frame bar 41 to a width of the second support surface on each second support frame bar 42 is 8:1 to 20:1, for example, 40:3.

In some embodiments, the width of the second support surface on the first support frame bar 41 is 10 mm to 14 mm, for example, 12 mm. The width of the second support surface on the second support frame bar 42 is 0.8 mm to 1.2 mm, for example, 0.9 mm.

In practical applications, the width of the second support surface on each support frame bar may be designed and adjusted according to actual needs.

Figure 13:
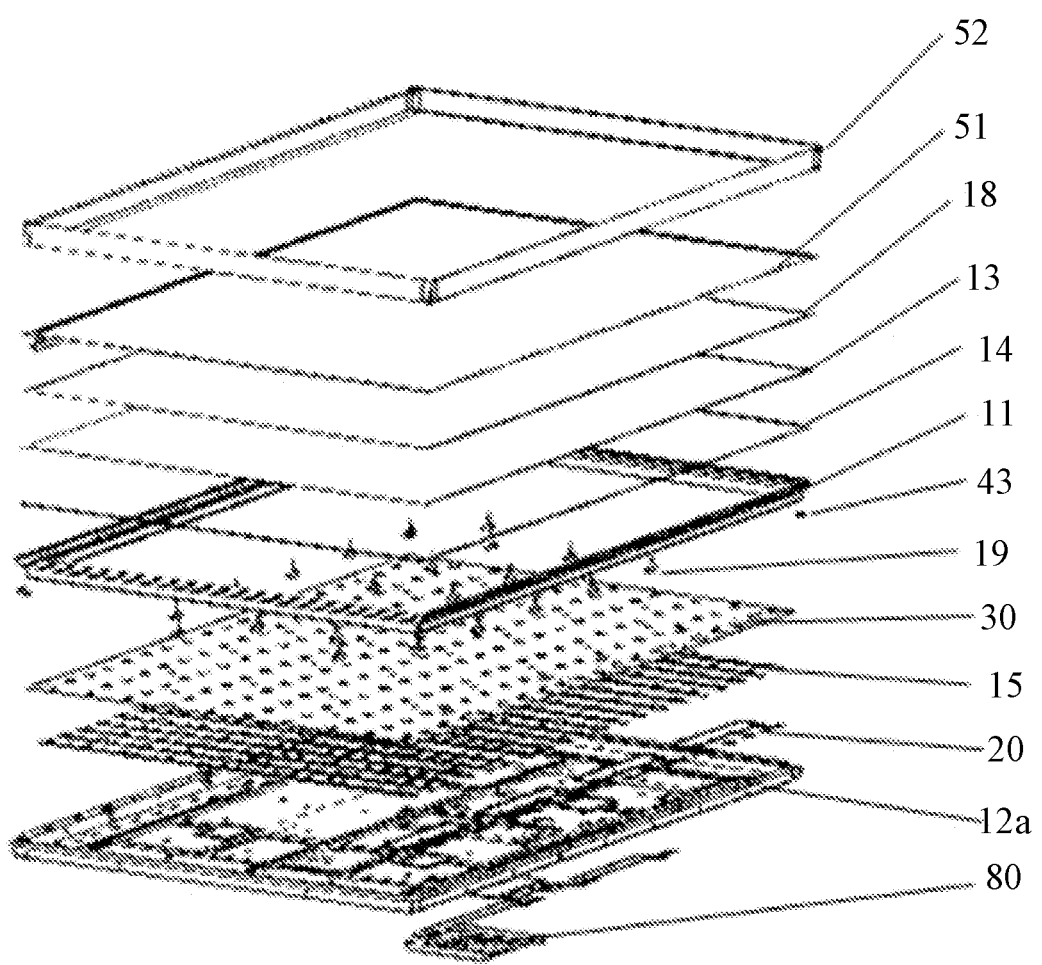
FIG. 13 is an exploded structural view of a display device according to an embodiment of the present disclosure.
Figure 14:
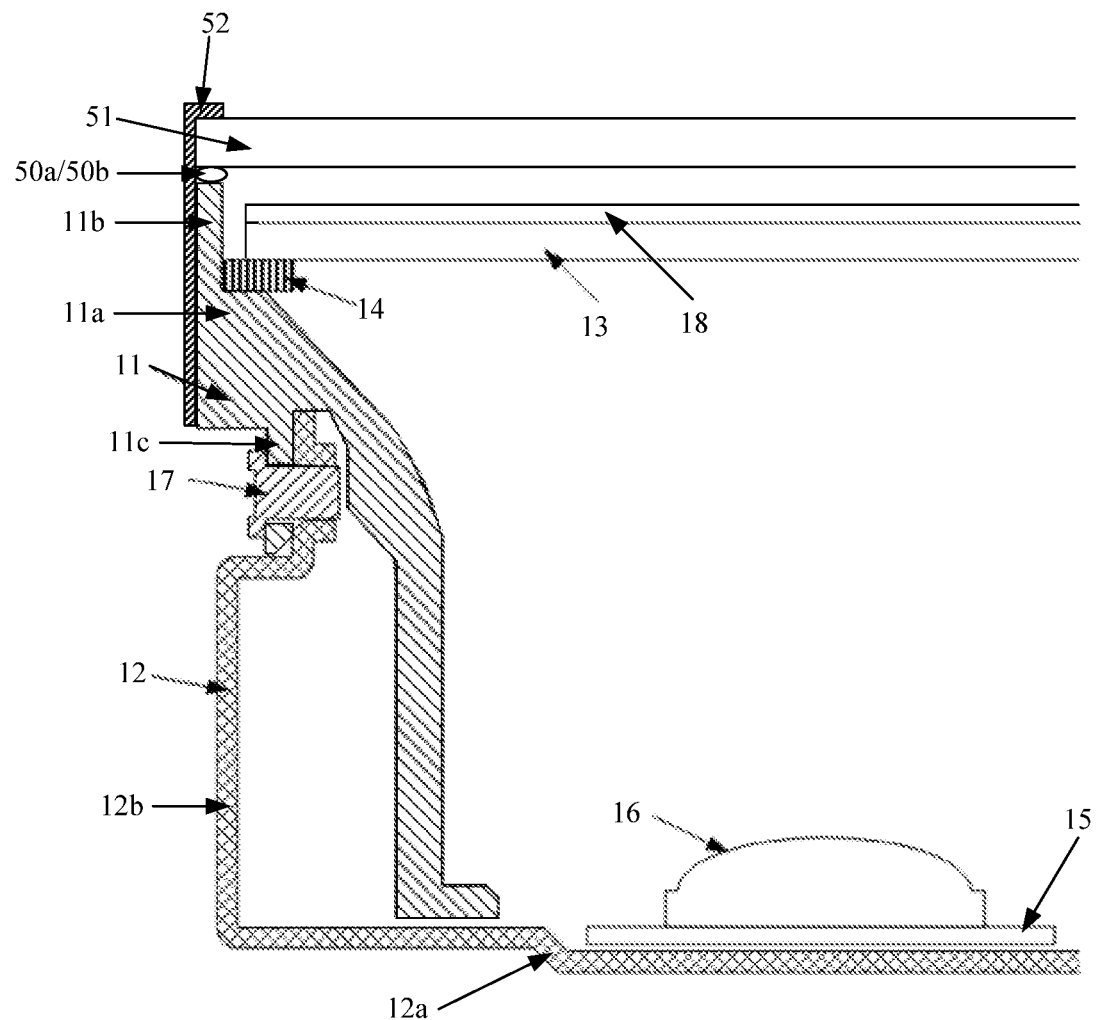
FIG. 14 is a schematic sectional view of a display device according to an embodiment of the present disclosure.

Based on a same inventive concept, an embodiment of the present disclosure further provides a display device. FIG. 13 is an exploded structural view of a display device according to an embodiment of the present disclosure, and FIG. 14 is a schematic sectional view of a display device according to an embodiment of the present disclosure. As shown in FIGS. 13 and 14, the display device includes a sub-backlight module, which may adopt the sub-backlight module provided in any of the above embodiments. For specific description of the sub-backlight module, reference may be made to the contents in the foregoing embodiments, and details are not repeated here.

In some embodiments, when the intermediate frame 11 includes four support frame bars, including one first support frame bar 41 and three second support frame bars 42, the display device further includes: a display panel 51 fixed to the second support surface of each support frame bar 40. The display panel includes an active area and a peripheral area surrounding the active area. The peripheral area includes: one chip-on-film side region and three non-chip-on-film side regions. The chip-on-film side region is arranged opposite to the second support surface on the first support frame bar 41, and the three non-chip-on-film side regions are respectively arranged opposite to the second support surfaces on the three second support frame bars 42.

The chip-on-film side region is used for realizing a chip on film (COF) process. The COF process includes: placing a display drive IC chip into an FPC flat cable, and then folding to a lower side of a screen by means of the properties of the FPC itself. Specifically, a gold bump on the IC chip is bonded with an inner lead of a flexible substrate circuit by thermocompression bonding. Since the space occupied by the IC chip is released, a width of the bezel can be effectively reduced.

In some embodiments, the chip-on-film side region is fixed to the second support surface on the first support frame bar 41 via a double-sided tape 50a. Each non-chip-on-film side region is fixed to the second support surface on the corresponding second support frame bar 42 via ultraviolet curing glue 50b.

Figure 15A:
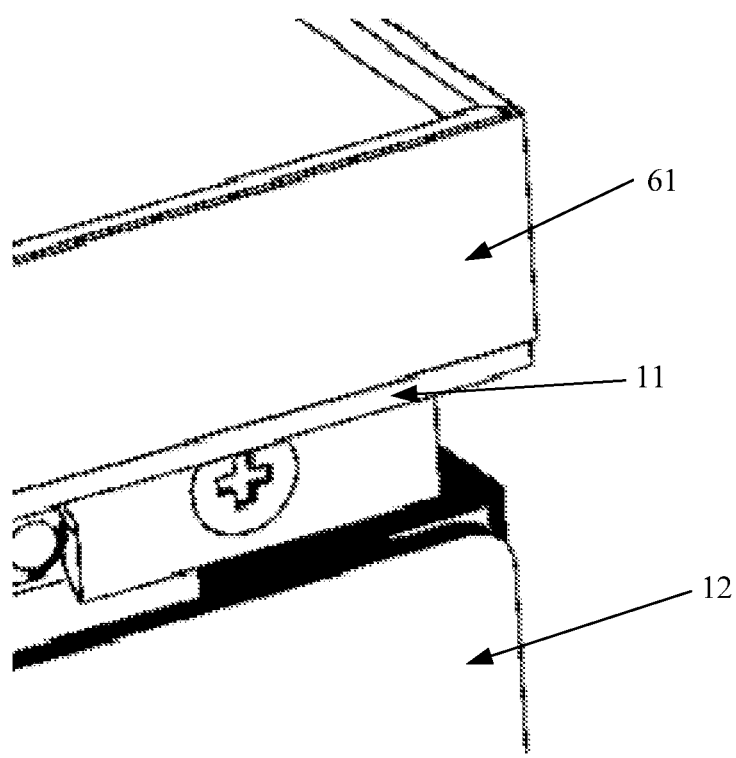
FIG. 15A is a schematic structural view of a second support frame bar with a first protective film adhered to an outer side wall of the second support frame bar.
Figure 15B:
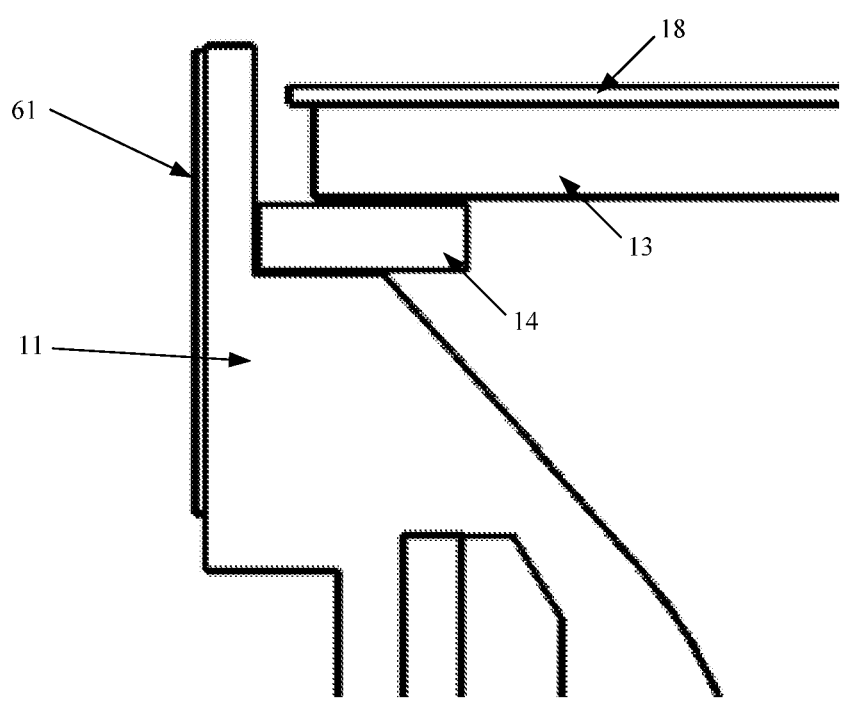
FIG. 15B is a schematic sectional view of a second support frame bar with a first protective film adhered to an outer side wall of the second support frame bar.
Figure 16A:
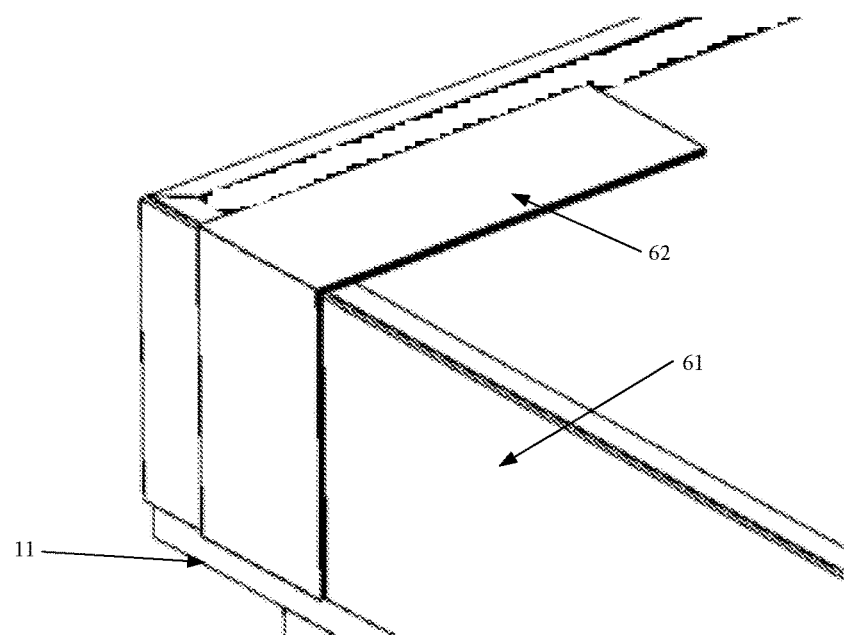
FIG. 16A is a schematic structural view of a second support frame bar with a masking tape adhered to a second support surface of the second support frame bar.
Figure 16B:
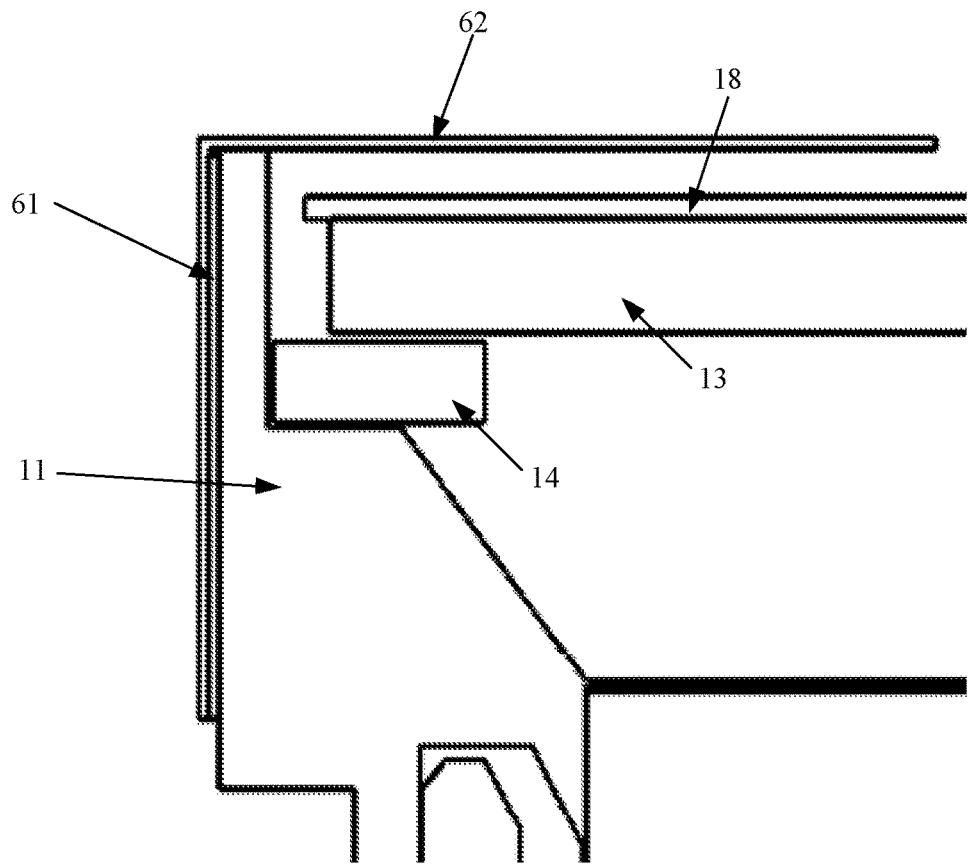
FIG. 16B is a schematic sectional view of a second support frame bar with a masking tape adhered to a second support surface of the second support frame bar.
Figure 17A:
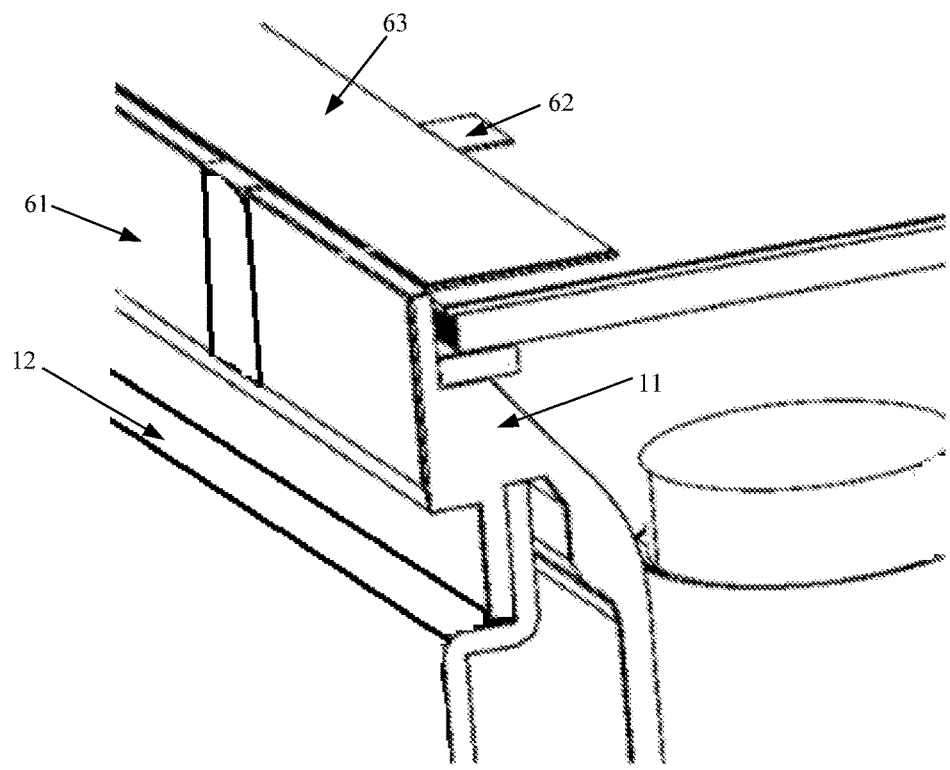
FIG. 17A is a schematic structural view of a second support frame bar with a first protective film adhered to an inner edge of a second support surface of the second support frame bar.
Figure 17B:
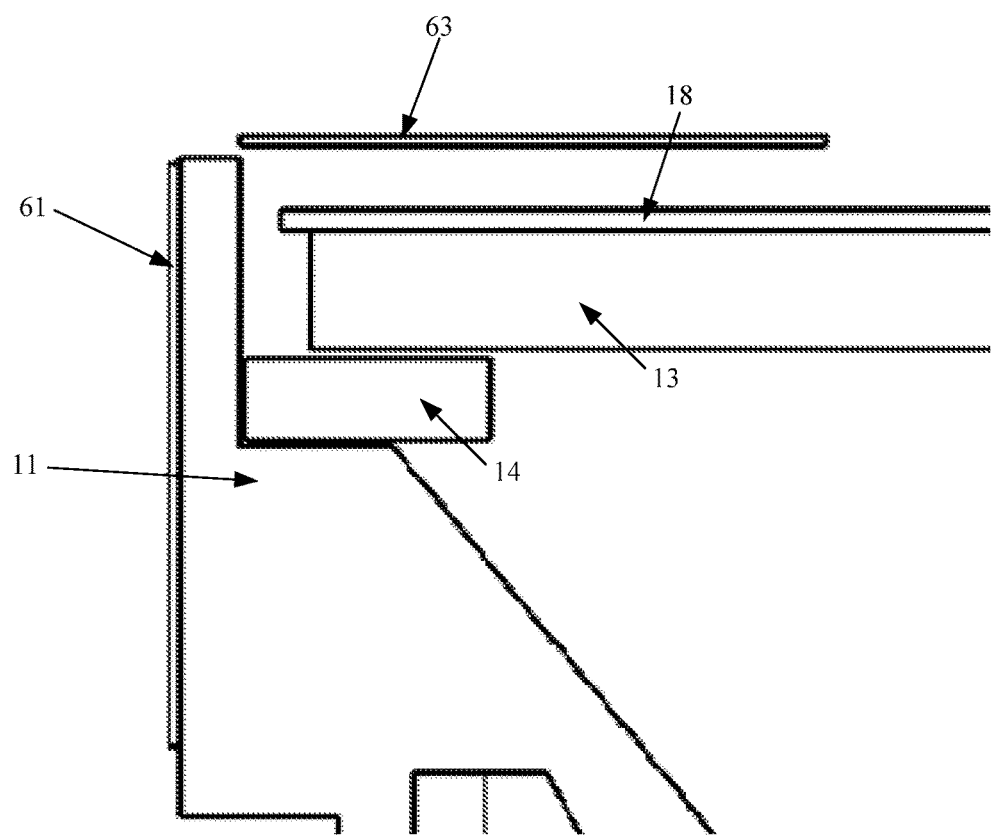
FIG. 17B is a schematic sectional view of a second support frame bar with a second protective film adhered to an inner edge of a second support surface of the second support frame bar.
Figure 18A:
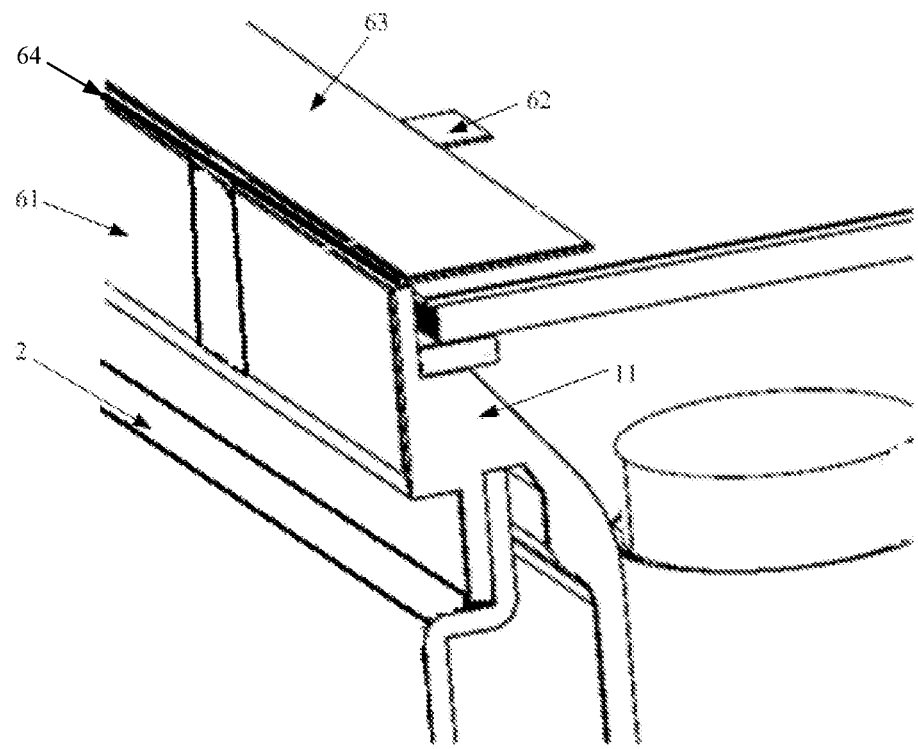
FIG. 18A is a schematic structural view of a second support frame bar with ultraviolet curing glue coated on a second support surface of the second support frame bar.
Figure 18B:
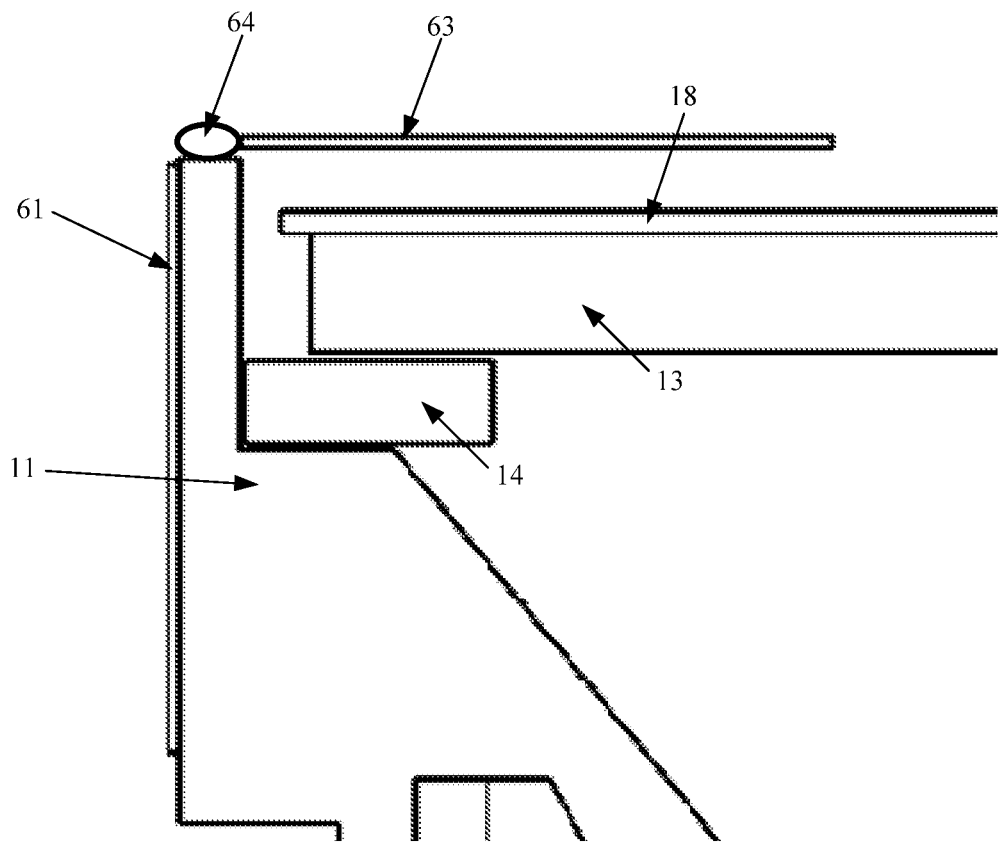
FIG. 18B is a schematic sectional view of a second support frame bar with ultraviolet curing glue coated on a second support surface of the second support frame bar.
Figure 19:
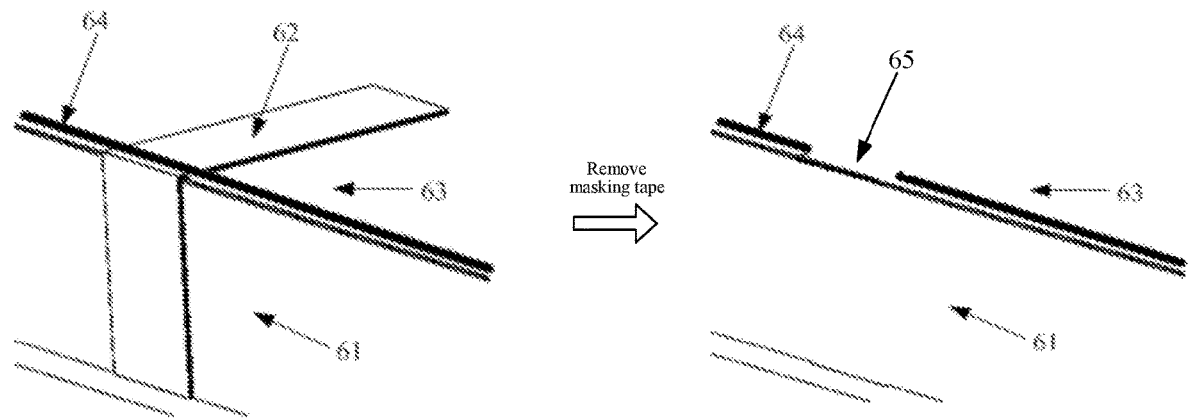
FIG. 19 is a schematic structural view when the masking tape is removed.
Figure 20:
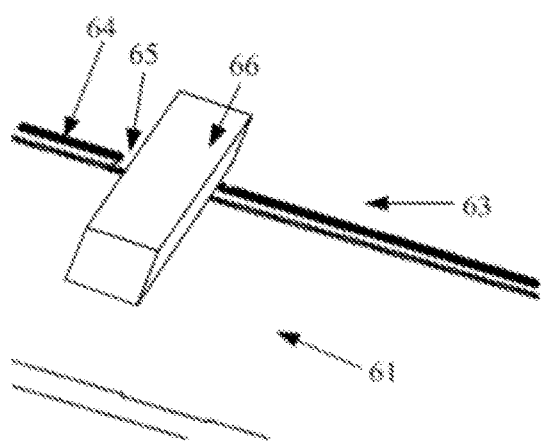
FIG. 20 is a schematic structural view of placing a support block in a region where the masking tape is removed.

FIG. 15A is a schematic structural view of a second support frame bar with a first protective film adhered to an outer side wall of the second support frame bar, FIG. 15B is a schematic sectional view of a second support frame bar with a first protective film adhered to an outer side wall of the second support frame bar, FIG. 16A is a schematic structural view of a second support frame bar with a masking tape adhered to a second support surface of the second support frame bar, FIG. 16 is a schematic sectional view of a second support frame bar with a masking tape adhered to a second support surface of the second support frame bar, FIG. 17A is a schematic structural view of a second support frame bar with a first protective film adhered to an inner edge of a second support surface of the second support frame bar, FIG. 17B is a schematic sectional view of a second support frame bar with a second protective film adhered to an inner edge of a second support surface of the second support frame bar, FIG. 18A is a schematic structural view of a second support frame bar with ultraviolet curing glue coated on a second support surface of the second support frame bar, FIG. 18B is a schematic sectional view of a second support frame bar with ultraviolet curing glue coated on a second support surface of the second support frame bar, FIG. 19 is a schematic structural view when the masking tape is removed, and FIG. 20 is a schematic structural view of placing a support block in a region where the masking tape is removed. As shown in FIGS. 15A to 20, in an embodiment of the present disclosure, after the sub-backlight module is assembled, the process flow of fixing the display panel 51 to each second support surface on the intermediate frame 11 is as follows:

First, referring to FIGS. 15A and 15B, a first protective film 61 is adhered to an outer side wall of each second support frame bar of the intermediate frame 11. The first protective film 61 is used to prevent the overflow glue from contacting the outer side wall of the second support frame bar when the glue overflows during the subsequent coating process of ultraviolet curing glue on the second support surface.

Then, referring to FIGS. 16A and 16B, a masking tape 62 is adhered to the second support surfaces of the second support frame bars of the intermediate frame 11 at intervals. For example, three to five pieces of masking tape 62 with a width of 10 mm is adhered to each second support surface at intervals.

Then, referring to FIGS. 17A and 17B, a second protective film 63 is adhered to an inner edge of the second support surface of the second support frame bar. The second protective film 63 may cover an edge of the optical film 18. The second protective film 63 is used to prevent the overflow glue from contacting the optical film 18 in the sub-backlight module when the glue overflows during the subsequent coating process of ultraviolet curing glue on the second support surface.

Then, referring to FIGS. 18A and 18B, ultraviolet curing glue 64 is continuously coated on the second support surface of the second support frame bar by a glue gun, where the ultraviolet curing glue 64 will cover a portion of the masking tape 62 on the second support surface. The glue is controlled to be coated with a width in the range of 0.6 mm to 0.8 mm, and a height in the range of 0.4 mm to 0.5 mm.

Then, referring to FIG. 19, the masking tape 62 is removed, and the ultraviolet curing glue 64 on the masking tape 62 is thus removed, so as to leave a notch 65 in the region originally covered by the masking tape.

Next, referring to FIG. 20, a support block 66, which may be a foam having a width of 5 mm and a thickness of 2 mm, is placed in the notch 65.

Then, a double-sided tape is adhered to the second support surface of the first support frame bar (this step may be performed in advance), and the first protective film 61 and the second protective film 63 are removed.

Then, the display panel 51 is placed on the support block 66, and the display panel 51 is aligned with the sub-backlight module. At this time, the display panel 51 does not contact the ultraviolet curing glue 64.

Then, the ultraviolet curing glue 64 on each second support frame bar is cured in sequence, and the corresponding support block is removed. Specifically, the process of performing ultraviolet curing on a certain second support frame bar and removing the corresponding support block is as follows: while curing the ultraviolet curing glue 64 on the second support frame bar, the support blocks 66 on the second support frame bar are removed one by one, and the display panel is lightly touched and pressed to make the display panel in contact with the ultraviolet curing glue on the second support frame bar, until the ultraviolet curing glue is completely cured.

Finally, the chip-on-film side region of the display panel is slightly touched and pressed (under 100 Kpa pressure for 30 seconds) so that a portion of the chip-on-film side region of the display panel is fixed with the double-sided tape.

In some embodiments, in order to avoid light leakage from the side of the display panel and to shield the peripheral area of the display panel, the side and the peripheral area of the display panel 51 may be covered by a light-shielding tape 52.

Figure 21:
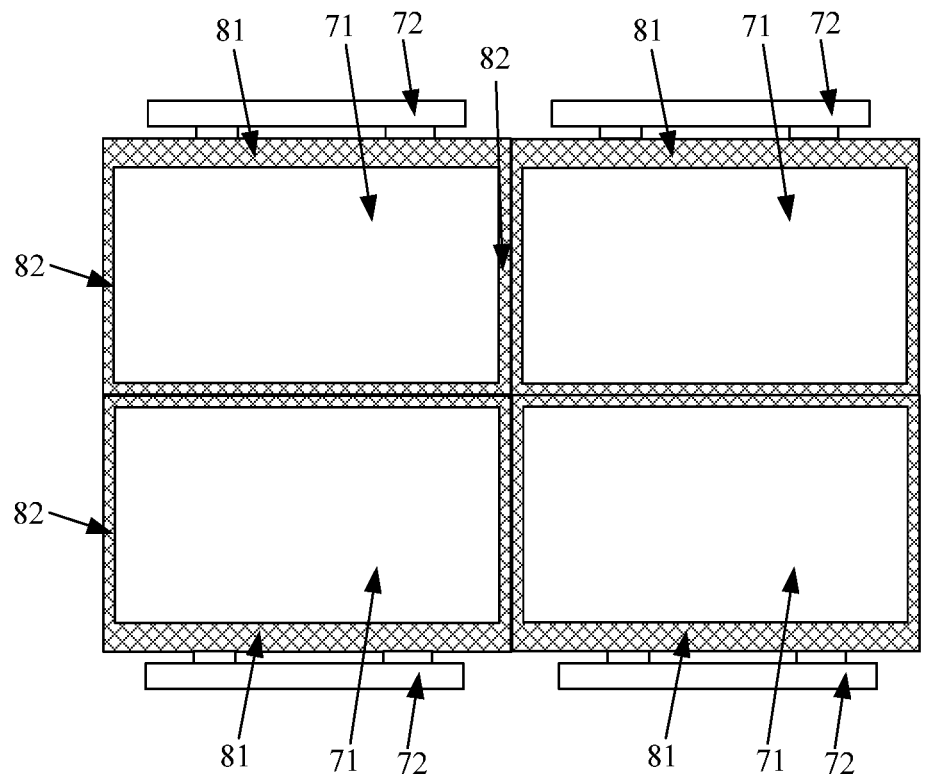
FIG. 21 is a schematic structural view of a splicing display module according to an embodiment of the present disclosure.

Based on a same inventive concept, an embodiment of the present disclosure further provides a splicing display module. FIG. 21 is a schematic structural view of a splicing display module according to an embodiment of the present disclosure. As shown in FIG. 21, in some embodiments, the splicing display module includes a display device, which may adopt a display substrate according to any of the above embodiments.

In some embodiments, the peripheral area of the display device 71 includes: one chip-on-film side region 81 and three non-chip-on-film side regions 82. The chip-on-film side region 81 is arranged opposite to the second support surface on the first support frame bar, and the three non-chip-on-film side regions 82 are respectively arranged opposite to the second support surfaces on the three second support frame bars.

The splicing display module specifically includes 2N display devices 71. The 2N display devices 71 are arranged in an array of two rows and N columns, where N is a positive integer. Chip-on-film side regions 81 of N display devices 71 in a first row are all positioned on a side away from a second row of display devices 71. Chip-on-film side regions 81 of N display devices 71 in the second row are all positioned on a side away from the first row of display devices 71. The drawings merely exemplarily show a case where N is 2.

In other words, for any two adjacent display devices 71, the non-chip-on-film side regions 82 of the two display devices 71 form a seam. Taking each non-chip-on-film side region 82 having a width of 0.9 mm as an example, the non-chip-on-film side regions 82 of the two display devices 71 may form a seam with a width less than 2 mm.

Taking the second row of display devices 71 in normal placement as an example, the first row of display devices 71 in this case are in an "upside down" state, so main boards 72 in the first row of display devices 71 are desired to have an image inversion function.

The splicing display module provided in the embodiment of the present disclosure can implement extremely narrow splicing seams while realizing normal display of the splicing image.

It will be appreciated that the above implementations are merely exemplary implementations for the purpose of illustrating the principle of the present disclosure, and the present disclosure is not limited thereto. It will be apparent to one of ordinary skill in the art that various modifications and variations may be made without departing from the spirit or essence of the present disclosure. Such modifications and variations should also be considered as falling into the protection scope of the present disclosure.

What is claimed is:

1. A support bracket for supporting a diffuser, characterized in comprising:
   a support post and a mounting part arranged in a first direction, wherein the mounting part comprises: an elastic connection part and a base arranged opposite to each other along the first direction,
   wherein the elastic connection part is connected to the base;
   wherein the support post extends in the first direction, and an end of the support post close to the mounting part is fixed to the elastic connection part;
   wherein the elastic connection part is configured to be elastically deformable in the first direction to change a distance between the end of the support post close to the mounting part and the base in the first direction;
   wherein the base is provided with a first screw hole; and
   wherein a portion of the base surrounding the first screw hole is outwardly convex toward a side away from the support post.

2. The support bracket according to claim 1, characterized in that the elastic connection part comprises: two elastic parts and a connection part arranged in a second direction,
   wherein the connection part is positioned between the two elastic parts, one end of each elastic part is connected to the base, the other end of the elastic part is connected to the connection part, and the end of the support post close to the mounting part is fixed to the connection part;
   wherein each elastic part is configured to be elastically deformable in the first direction to change a distance between the connection part and the base in the first direction, wherein the first direction is intersected with the second direction;
   wherein the elastic part is outwardly convex toward a side away from the base, and the connection part is arranged parallel to the base;
   wherein the elastic part comprises a first part, a second part and a third part connected in sequence;
   wherein the first part is connected to the base, and the third part is connected to the connection part;
   wherein from the connection between the second part and the first part to the connection between the second part and the third part, a vertical distance between the second part and the base in the first direction gradually increases along the second direction; and
   wherein from the connection between the third part and the second part to the connection between the third part and the connection part, a vertical distance between the third part and the base in the first direction gradually decreases along the second direction.

3. The support bracket according to claim 1, characterized in that on the support post away from the mounting part in the first direction, the support post has a cross section perpendicular to the first direction with an area that first remains constant and then gradually decreases; and
   wherein the support post has the cross section perpendicular to the first direction with a rectangular or trapezoidal shape.

4. A sub-backlight module, characterized in comprising:
   a back plate comprising a bottom plate and a side plate;
   an intermediate frame and a diffuser, wherein the intermediate frame is assembled with and fixed to the back plate; and
   a support bracket for supporting the diffuser, wherein the support bracket comprises a support post and a mounting part arranged in a first direction, wherein the mounting part comprises a connection part and a base arranged opposite to each other along the first direction;
   wherein the connection part is connected to the base;
   wherein the support post extends in the first direction, and an end of the support post close to the mounting part is fixed to the connection part;
   wherein the side plate is positioned on a first side of the bottom plate and connected to an edge portion of the bottom plate;
   wherein the support bracket is positioned on the first side of bottom plate, with the mounting part of the support bracket fixed to the bottom plate;
   wherein the intermediate frame comprises: a first support structure and a second support structure, wherein a side of the first support structure away from the bottom plate is a first support surface, and the second support structure is positioned on a side of the first support surface away from the bottom plate;
   wherein the diffuser is positioned on the side of the first support surface away from the bottom plate and on an inner side of the second support structure, a clearance space is formed between the diffuser and an inner side wall of the second support structure, and an orthographic projection of the diffuser on the first support surface overlaps the first support surface;
   wherein a light guide bar is provided between the first support surface and the diffuser; and
   wherein a first side of the light guide bar close to the second support structure is in contact with the inner side wall of the second support structure.

5. The sub-backlight module according to claim 4, characterized in further comprising: a plurality of light bars arranged in a third direction, wherein each light bar comprises a plurality of lamp beads arranged in a fourth direction; and
   a ratio of the number of lamp beads to the number of support brackets is 6:1 to 10:1.

6. The sub-backlight module according to claim 5, characterized in that for any one of the support brackets, a center of an orthographic projection of the support post on the bottom plate overlaps with a center of a quadrangle enclosed by centers of orthographic projections of four lamp beads closest to the support bracket on the bottom plate.

7. The sub-backlight module according to claim 6, characterized in that a plurality of support brackets arranged in the fourth direction are provided on a central axis of the bottom plate,
   wherein the central axis of the bottom plate is a virtual line that passes through a center of a surface on a first side of the bottom plate and extends along the fourth direction.

8. The sub-backlight module according to claim 7, characterized in that the surface on the first side of the bottom plate has a first peripheral placement region, a central placement region and a second peripheral placement region sequentially arranged in the third direction;
   the first peripheral placement region and the second peripheral placement region are each provided with at least two support bracket sets, wherein the at least two support bracket sets comprise: a first support bracket set, and a second support bracket set on a side of the first support bracket set away from the central placement region,
at least two light bars are provided between the first support bracket set and the second support bracket set; and
the first support bracket set and the second support bracket set each comprise at least two of the support brackets arranged in the fourth direction, and the number of support brackets in the first support bracket set is larger than the number of support brackets in the second support bracket set.

9. The sub-backlight module according to claim 5, characterized in that the base is provided with a first screw hole, and a reflective sheet is disposed on a side of the light bar facing away from the bottom plate;
the reflective sheet is provided with a plurality of first openings in one-to-one correspondence with the lamp beads, and each lamp bead is exposed out of the corresponding first opening;
the reflective sheet is provided with a plurality of second openings in one-to-one correspondence with the support brackets, and the bottom plate is provided with a plurality of second screw holes; and
each support bracket is fixed to the bottom plate via a screw penetrating the corresponding second opening, the first screw hole, and the corresponding second screw hole in the bottom plate.

10. The sub-backlight module according to claim 5, characterized in that all the light bars are divided into a plurality of light bar sets, each light bar set comprises at least one light bar, each light bar set is configured with a corresponding adapter plate, and each light bar is electrically connected to the corresponding adapter plate through a first flexible flat cable;
the adapter plate is fixed on a first side of the bottom plate, and the adapter plate is electrically connected to a power supply control module on a second side of the bottom plate through a second flexible flat cable penetrating the bottom plate; and
a receiving slot is formed on the bottom plate in a region corresponding to the adapter plate, and the adapter plate is positioned in the corresponding receiving slot.

11. The sub-backlight module according to claim 4, characterized in that
a second side of the light guide bar away from the second support structure exceeds an inner edge of the first support surface.

12. The sub-backlight module according to claim 11, characterized in that a prism film is formed on the inner side wall of the second support structure, and configured to reflect the light in the clearance space emitted to the inner side wall of the second support structure toward the light guide bar.

13. The sub-backlight module according to claim 11, characterized in that the intermediate frame comprises four support frame bars connected end to end in sequence, each support frame bar comprises the first support structure and the second support structure, and a side of the second support structure away from the bottom plate is a second support surface;
the four support frame bars comprise one first support frame bar and three second support frame bars; and
a ratio of a width of the second support surface on the first support frame bar to a width of the second support surface on each second support frame bar is 8:1 to 20:1.

14. A display device, characterized in comprising: the sub-backlight module as claimed in claim 4.

15. The display device according to claim 14, characterized in that the sub-backlight module further comprises: a intermediate frame and a diffuser, wherein the intermediate frame is assembled with and fixed to the back plate;
the intermediate frame comprises: a first support structure and a second support structure, wherein a side of the first support structure away from the bottom plate is a first support surface, and the second support structure is positioned on a side of the first support surface away from the bottom plate;
the diffuser is positioned on the side of the first support surface away from the bottom plate and on an inner side of the second support structure, a clearance space is formed between the diffuser and an inner side wall of the second support structure, and an orthographic projection of the diffuser on the first support surface overlaps the first support surface;
a light guide bar is provided between the first support surface and the diffuser;
a first side of the light guide bar close to the second support structure is in contact with the inner side wall of the second support structure;
a second side of the light guide bar away from the second support structure exceeds an inner edge of the first support surface;
the intermediate frame comprises four support frame bars connected end to end in sequence, each support frame bar comprises the first support structure and the second support structure, and a side of the second support structure away from the bottom plate is a second support surface;
the four support frame bars comprise one first support frame bar and three second support frame bars;
a ratio of a width of the second support surface on the first support frame bar to a width of the second support surface on each second support frame bar is 8:1 to 20:1;
wherein the display device further comprises: a display panel fixed to the second support surface;
the display panel comprises an active area and a peripheral area surrounding the active area, and the peripheral area comprises: one chip-on-film side region and three non-chip-on-film side regions; and wherein
the chip-on-film side region is arranged opposite to the second support surface on the first support frame bar, and the three non-chip-on-film side regions are respectively arranged opposite to the second support surfaces on the three second support frame bars.

16. A splicing display module, comprising: 2N display devices, which adopt the display device according to claim 15, wherein the 2N display devices are arranged in an array of two rows and N columns, where N is a positive integer;
chip-on-film side regions of N display devices in a first row are all positioned on a side away from a second row of display devices; and
chip-on-film side regions of N display devices in the second row are all positioned on a side away from the first row of display devices.

17. The sub-backlight module according to claim 4, characterized in that the connection part is elastic; and
wherein the connection part is configured to be elastically deformable in the first direction to change a distance between the end of the support post close to the mounting part and the base in the first direction.

18. A sub-backlight module, characterized in comprising:
a back plate comprising a bottom plate and a side plate;

a support bracket for supporting a diffuser, wherein the support bracket comprises a support post and a mounting part arranged in a first direction, wherein the mounting part comprises a connection part and a base arranged opposite to each other along the first direction; and a plurality of light bars arranged in a third direction, wherein each light bar comprises a plurality of lamp beads arranged in a fourth direction, and a ratio of the number of lamp beads to the number of support brackets is 6:1 to 10:1;

wherein the connection part is connected to the base;

wherein the support post extends in the first direction, and an end of the support post close to the mounting part is fixed to the connection part;

wherein the side plate is positioned on a first side of the bottom plate and connected to an edge portion of the bottom plate;

wherein the support bracket is positioned on the first side of bottom plate, with the mounting part of the support bracket fixed to the bottom plate;

wherein all the light bars are divided into a plurality of light bar sets, each light bar set comprises at least one light bar, each light bar set is configured with a corresponding adapter plate, and each light bar is electrically connected to the corresponding adapter plate through a first cable;

wherein the adapter plate is fixed on a first side of the bottom plate, and the adapter plate is electrically connected to a power supply control module on a second side of the bottom plate through a second cable penetrating the bottom plate; and wherein a receiving slot is formed on the bottom plate in a region corresponding to the adapter plate, and the adapter plate is positioned in the corresponding receiving slot.

19. The sub-backlight module according to claim 18, characterized in that the connection part is elastic; and wherein the connection part is configured to be elastically deformable in the first direction to change a distance between the end of the support post close to the mounting part and the base in the first direction.

20. The sub-backlight module according to claim 18, characterized in that the first cable and the second cable are flexible flat.

* * * * *